(12) United States Patent
Takada

(10) Patent No.: US 8,031,951 B2
(45) Date of Patent: Oct. 4, 2011

(54) 2-DIMENSIONAL SIGNAL ENCODING/DECODING METHOD AND DEVICE

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 568 days.

(21) Appl. No.: 10/590,245

(22) PCT Filed: Dec. 28, 2004

(86) PCT No.: PCT/JP2004/019604
§ 371 (c)(1),
(2), (4) Date: Aug. 22, 2006

(87) PCT Pub. No.: WO2005/081539
PCT Pub. Date: Sep. 1, 2005

(65) Prior Publication Data
US 2007/0165959 A1  Jul. 19, 2007

(30) Foreign Application Priority Data

Feb. 23, 2004 (JP) ................. 2004-045659
Nov. 9, 2004 (JP) ................. 2004-324875

(51) Int. Cl.
*G06K 9/36* (2006.01)
*G06K 9/46* (2006.01)
(52) U.S. Cl. ........................ 382/232; 382/240
(58) Field of Classification Search .............. 382/232, 382/240
See application file for complete search history.

(56) References Cited

U.S. PATENT DOCUMENTS

| 6,438,167 B1 | 8/2002 | Shimizu et al. |
| 6,477,280 B1 | 11/2002 | Malvar |
| 6,549,674 B1 * | 4/2003 | Chui et al. ............ 382/240 |
| 6,763,139 B1 * | 7/2004 | Andrew ............... 382/240 |
| 6,778,709 B1 * | 8/2004 | Taubman ............. 382/240 |

(Continued)

FOREIGN PATENT DOCUMENTS

EP  0 971 544 A2  1/2000

(Continued)

OTHER PUBLICATIONS

Kato, M.; Matsumura, S.; Takebe, T., "Wavelet image coding using direction and power classified vector quantization". 3rd International Conference on Signal Processing, 1996, pp. 827-830 vol. 2.*

(Continued)

*Primary Examiner* — Samir Ahmed
*Assistant Examiner* — Li Liu
(74) *Attorney, Agent, or Firm* — Scully, Scott, Murphy & Presser, P.C.

(57) ABSTRACT

An image is divided into subbands by wavelet transform using the Haar function as the base, and the lowest-frequency LL subband is entirely encoded. LH, HL, and HH subband coefficients which belong to the wavelet decomposition level of each hierarchy are then encoded such that coefficients at the same spatial position are encoded at once. The decoding side first decompresses the lowest-frequency LL subband, and then decodes sets of the LH, HL, and HH coefficients at the same spatial position in the subband of each wavelet decomposition level one by one. The decoding side immediately performs inverse wavelet transform by using the coefficient values, thereby obtaining the LL coefficient value of the next wavelet decomposition level. This makes it possible to sufficiently increase the processing speed even when the wavelet encoding/decoding is performed using a sequential CPU.

16 Claims, 26 Drawing Sheets

U.S. PATENT DOCUMENTS

| | | | |
|---|---|---|---|
| 6,788,811 B1* | 9/2004 | Matsuura et al. | 382/166 |
| 6,801,667 B1* | 10/2004 | Lindquist | 382/240 |
| 6,985,158 B2* | 1/2006 | Miller et al. | 345/598 |
| 7,120,306 B2* | 10/2006 | Okada et al. | 382/240 |
| 2002/0009233 A1* | 1/2002 | Pesquet-Popescu | 382/240 |
| 2002/0057844 A1* | 5/2002 | Sirohey et al. | 382/240 |
| 2003/0108247 A1* | 6/2003 | Acharya et al. | 382/240 |
| 2003/0169935 A1* | 9/2003 | Sano et al. | 382/240 |
| 2005/0036701 A1* | 2/2005 | Miyazawa et al. | 382/240 |

FOREIGN PATENT DOCUMENTS

| | | |
|---|---|---|
| EP | 1 349 393 A1 | 10/2003 |
| JP | 03-016490 | 1/1991 |
| JP | 09-148938 | 6/1997 |
| JP | 11-069164 | 3/1999 |
| JP | 11-298897 | 10/1999 |
| JP | 11-317950 | 11/1999 |
| JP | 2000-316152 | 11/2000 |
| JP | 2000-316174 | 11/2000 |
| JP | 2002-016808 | 1/2002 |
| JP | 2002-232721 | 8/2002 |
| JP | 2003-504921 | 2/2003 |
| JP | 2003-204439 | 7/2003 |
| JP | 2003-274185 | 9/2003 |
| JP | 2003-274190 | 9/2003 |
| WO | WO 01/03070 A1 | 1/2001 |

OTHER PUBLICATIONS

Calderbank et al. "Lossless image compression using integer to integer wavelet transforms", IEEE Proceedings of International Conference on Image Processing, 1997, pp. 596-599 vol. 1.*

Porwik et al. "The Haar-Wavelet Transform in Digital Image Processing: its status and achievements", Machine Graphics & vision, vol. 13, 2004, pp. 79-98.*

Shuitsu Matsumara, et al., "Wavelet Image Coding Using Power Adaptive Vector Quantization", PCSJ95, Oct. 1995, pp. 121-122.

Shuitsu Matsumara, et al., "Wavelet Image Coding Using Power Adaptive Vector Quantization", Transactions of the IEICE, vol. 80-D-II, No. 1, Jan. 1997, pp. 139-147, together with English Abstract.

Hideki Tosaka et al., "Studies on High Definition Image Coding Using Wavelet Transform", Technical Report of IEICE, vol. 96, No. 187, DSP96-59, SST 96-41, CS96-59, Jul. 26, 1996, pp. 31-36.

Hironobu Ohira et al., "Discrete Wavelet Transform Entropy Coding Method for Images based on Gaussian Mixture Distribution Model", ITE Technical Report, vol. 22, No. 71, Dec. 17, 1998, pp. 37-42.

European Official Action dated Mar. 1, 2011 from EP 04 807 959.4—222.

* cited by examiner

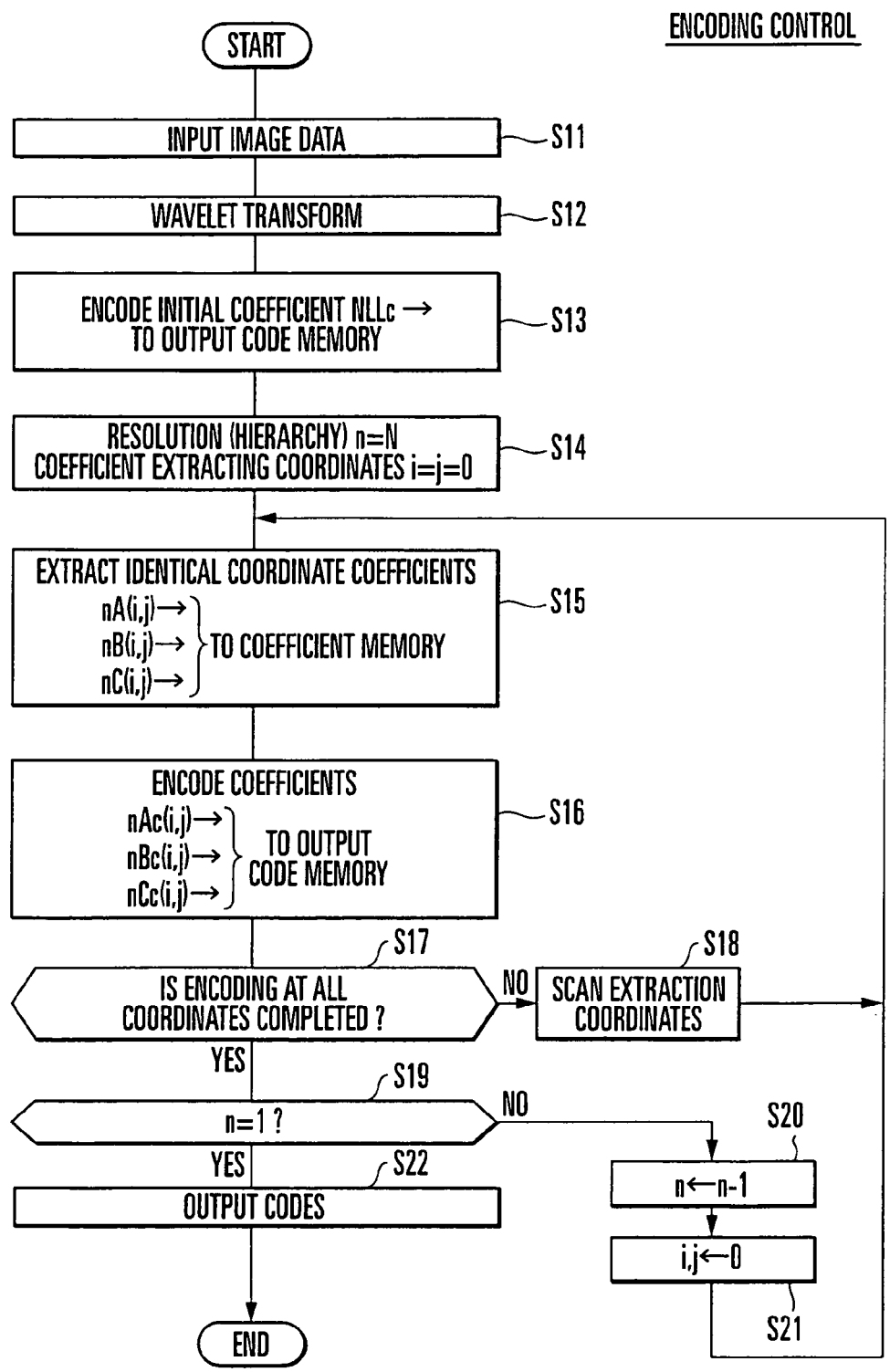
F I G. 3

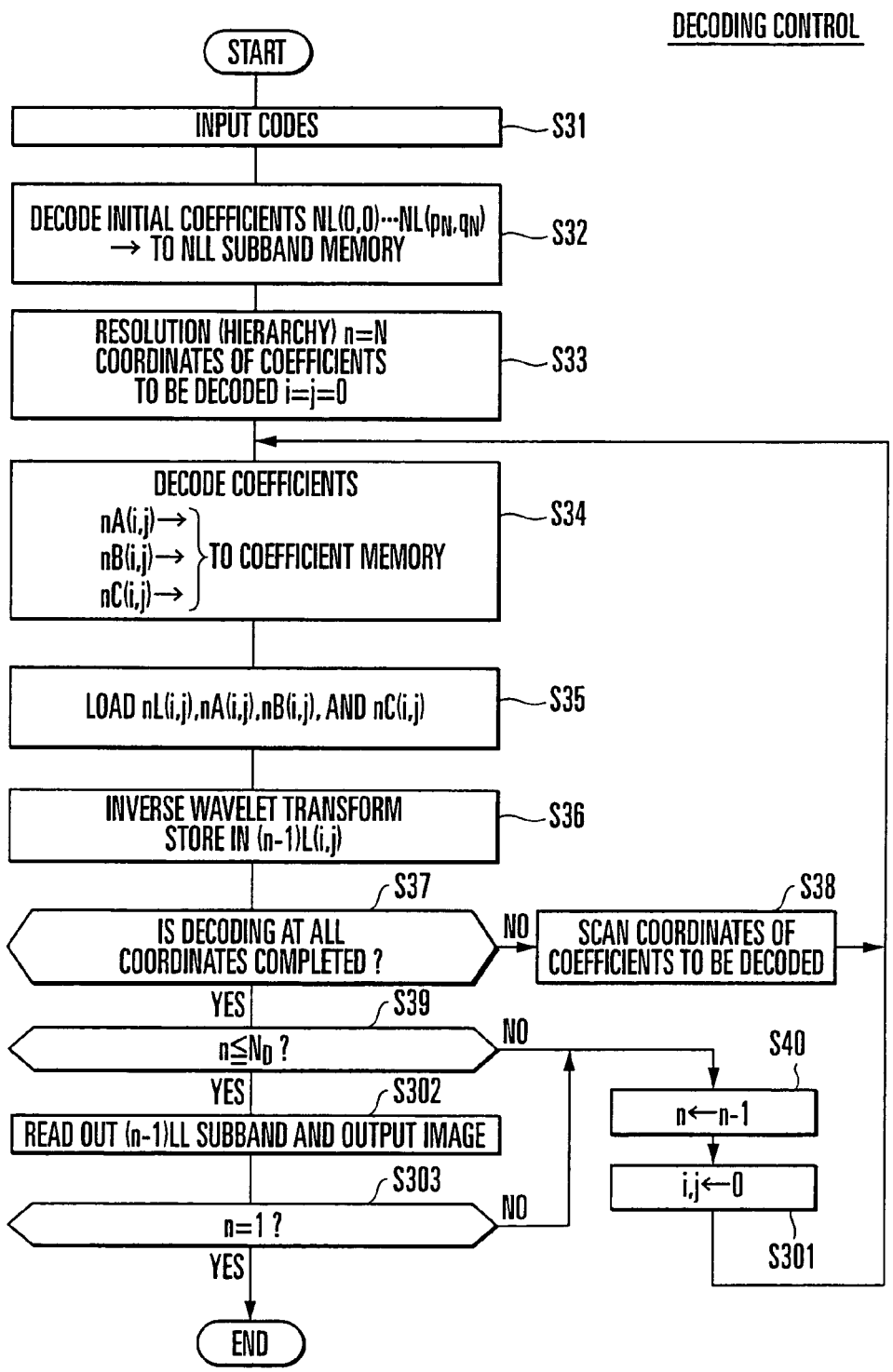
F I G. 5

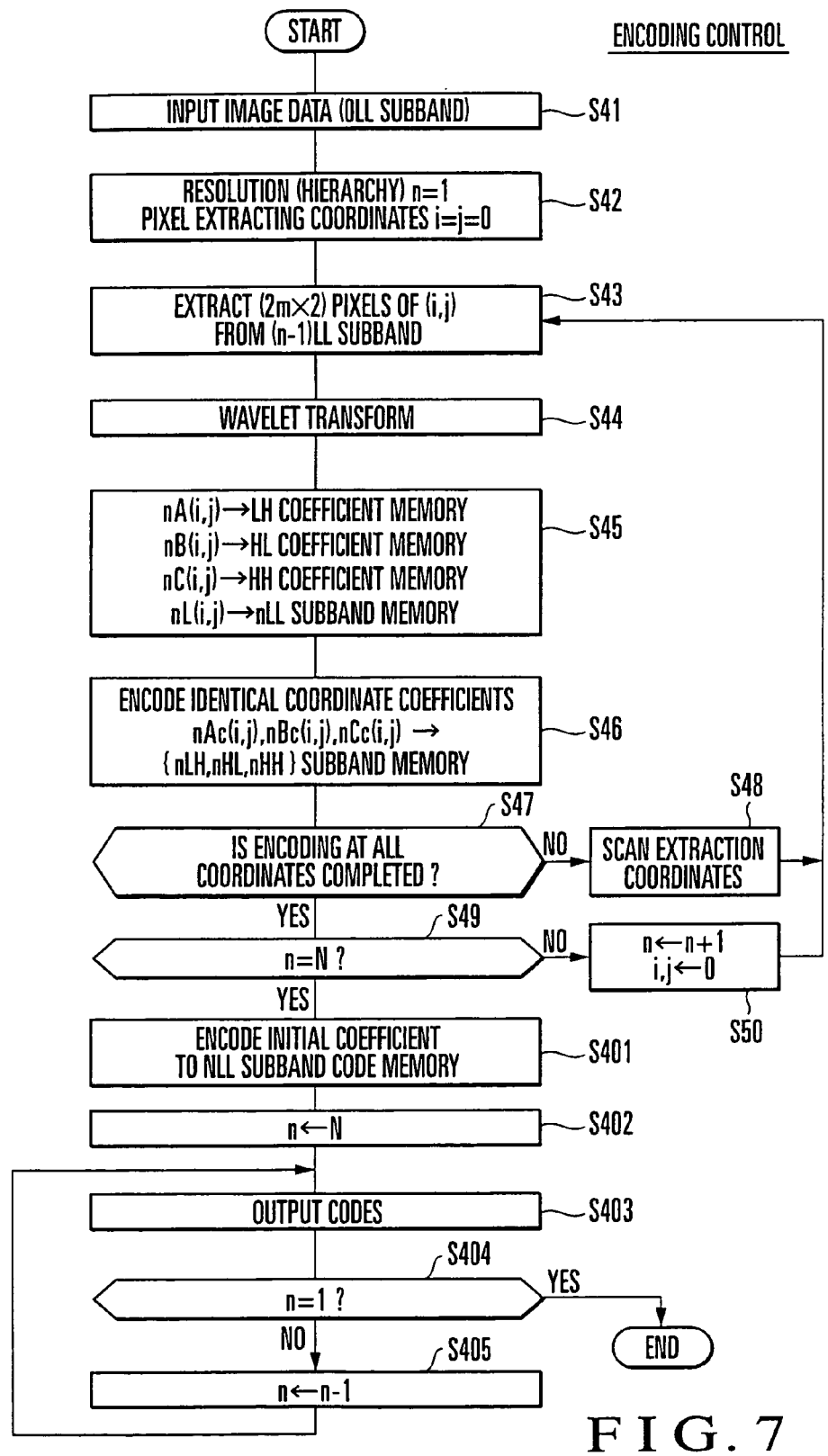
F I G. 7

2-DIMENSIONAL SIGNAL ENCODING/DECODING METHOD AND DEVICE

TECHNICAL FIELD

The present invention relates to a two-dimensional signal compressing/decompressing method and, more particularly, to a two-dimensional signal encoding/decoding method and device using wavelet transform.

BACKGROUND ART

When a two-dimensional signal represented by an image signal is to be stored in a recording medium or transmitted across a network, it is essential to compress or encode the data in order to efficiently use the recording medium or transmission path. Conventionally, various methods such as coding using DCT (Discrete Cosine Transform) and predictive coding have been proposed and used in practice. Recently, information compression methods using wavelet transform are extensively studied, and various proposals are made.

For example, in an encoding/decoding method described in patent reference 1 (Japanese Patent Laid-Open No. 9-148938), a two-dimensional image is first divided into tiles, and wavelet transform is repetitively applied to each tile to hierarchically divide it into frequency subbands. After that, variable-length coding is performed on each subband obtained by the division, and codes are output in order from low-frequency subbands. The merits of the division into subbands are that the code efficiency can be increased by collecting near-by regions having close coefficient statistical properties and performing optimum encoding for each region, and that encoding and decoding can be performed in parallel by hardware. Note that the code efficiency decreases if the division into tiles is excessively performed, so the division size is normally set to about 64×64 or more. However, a method which performs wavelet transform after the division into tiles has the problem that a discontinuous distortion, i.e., block noise is produced in the tile boundary. Also, in an encoding/decoding method described in patent reference 2 (Japanese Patent Laid-Open No. 2000-316152), each subband having undergone wavelet transform is divided into blocks (8×8), and each block is encoded. This method has the merit that no block noise is produced because the division into blocks is performed after the wavelet transform.

It is possible by performing subband encoding by using the above methods to provide a progressive display function which increases the resolution with time, and reduce the cognitive waiting time of an image viewer. For example, patent reference 3 (Japanese Patent Laid-Open No. 11-298897) has disclosed an image data transmission method by which the size of an image to be displayed increases as the resolution rises.

Also, patent reference 4 (Japanese Patent Laid-Open No. 2003-504921) has disclosed a method which divides an image and draws the divided sub-images at different wavelet decoding rates. More specifically, by using the fact that the central portion of a frame is a region at which the user looks most carefully, details are drawn earliest in sub-images in the central portion and gradually drawn with a delay from the center to the periphery. This display function can also reduce the cognitive waiting time of an image viewer.

DISCLOSURE OF INVENTION

Problems to be Solved by the Invention

Unfortunately, since both the methods described in patent references 1 and 2 are premised on parallel processing, no sufficient processing speed can be obtained when decoding is performed using a general-purpose sequential CPU. The main causes are as follows.

First, the CPU must access a memory address storing each coefficient value twice, i.e., when the coefficient is encoded (or decoded) and when a wavelet operation (or an inverse wavelet operation) is performed. The memory access time of the CPU is generally longer than its internal operation time, so the processing speed largely decreases if the number of times of memory access is large.

Second, when the CPU performs memory access to each tile or each block, addresses storing coefficients are positioned away from a scan line and extend over a number of lines. For example, when a 2LH subband is divided into blocks (8×8), memory access is performed on eight scan lines in order to decompress 2LH. This disperses the memory access destinations, and decreases the efficiency of a cache memory. A general CPU includes a cache memory, and hence can perform local memory access at high speed. If the memory access destinations are dispersed as described above, however, access to a real memory occurs, and this largely decreases the processing speed.

In addition, the above conventional methods have the problem that a large intermediate memory is necessary. This is so because LH, HL, and HH subbands must be held on the memory from the start of wavelet transform of a certain tile or block to the completion of encoding of the tile or block during encoding, or from the start of coefficient decoding of a certain tile or block to the completion of inverse wavelet transform during decoding.

It is, therefore, an object of the present invention to provide an encoding/decoding method and device capable of well increasing the processing speed even when wavelet encoding/decoding is performed using a sequential CPU.

It is another object of the present invention to provide an encoding/decoding method and device capable of reducing the capacity of an intermediate memory required to temporarily store subbands in wavelet encoding/decoding.

Means for Solving the Problems

An encoding device according to the first aspect of the present invention is characterized by comprising wavelet transforming means for dividing a two-dimensional signal into subbands as a plurality of frequency regions, coefficient extracting means for extracting sets of coefficients for every predetermined number of sets of coefficients which belong to the same spatial position from a plurality of subbands which belong to a wavelet decomposition level of the same hierarchy, and coefficient encoding means for encoding the extracted coefficient sets.

An encoding device according to the second aspect of the present invention is characterized by comprising element extracting means for sequentially extracting 2 m×2 (m is an integer: m≧1) spatially adjacent elements from a two-dimensional signal, wavelet transforming means for dividing the 2 m×2 elements into a plurality of subband coefficient sets, coefficient encoding means for encoding the coefficient sets, and code output means for rearranging the encoded coefficient sets in order from a low-resolution subband, and outputting the rearranged coefficient sets.

A decoding device according to the third aspect of the present invention is a decoding device which receives a code sequence formed by encoding coefficients of a plurality of subbands obtained by wavelet transform and generates the original two-dimensional signal, characterized by comprising initial coefficient decoding means for decoding a coefficient of a lowest-frequency subband from a code sequence corresponding to the lowest-frequency subband, coefficient decoding means for decoding sets of coefficients for every predetermined number of sets of coefficients which belong to the same spatial position in a plurality of subbands which belong to a wavelet transform level of the same hierarchy from a code sequence following the lowest-frequency subband code sequence, and inverse wavelet transforming means for performing inverse wavelet transform whenever the coefficient set is decoded.

In the present invention, an image is divided into subbands by wavelet transform using the Haar function as the base, and the lowest-frequency LL subband is entirely encoded. LH, HL, and HH subband coefficients which belong to the wavelet decomposition level of each hierarchy are then encoded such that coefficients at the same spatial position are encoded at once. The decoding side first decompresses the lowest-frequency LL subband, and then decodes sets of the LH, HL, and HH coefficients at the same spatial position in the subband of each wavelet decomposition level one by one. The decoding side immediately performs inverse wavelet transform by using the coefficient values, thereby obtaining the LL coefficient value of the next wavelet decomposition level.

Effects of the Invention

In the present invention as described above, coefficients corresponding to the same image position are sequentially read out from the LH, HL, and HH subbands and encoded, so the number of times of store/load to a real memory can be reduced even when a general-purpose sequential CPU is used, and this makes high-speed processing possible. In addition, since coefficients at the same position in the LH, HL, and HH subbands are sequentially encoded at the same time, data of the LH, HL, and HH subbands need not be held until the encoding is completed.

Also, since sequential encoding can be performed, a high-speed register or cache memory of a CPU can be used as a coefficient memory for storing coefficients to be encoded, and this further increases the encoding speed.

During decoding, whenever a set of the LH, HL, and HH subband coefficients is decoded, the decoded coefficient values immediately undergo an inverse wavelet operation, thereby reducing the number of times of access to a real memory. In addition, as memory access during decoding, LL subband read is successively performed on the same scan line, and write of the results of the inverse wavelet operation is also successively performed for only two scan lines, thereby increasing the cache memory efficiency. Furthermore, the capacity of an intermediate memory required to temporarily store subbands can be reduced.

As described above, decoding of a set of the LH, HL, and HH subband coefficients and the inverse wavelet operation of the decoded coefficients can be performed via a high-speed memory such as a register. This makes it possible to increase the speed of decoding even when a general-purpose sequential CPU is used. Also, since subbands need not be entirely stored in an intermediate memory, the memory use amount can be reduced. Furthermore, when parallel processing can be performed by hardware, the decoding speed can be further increased by using the conventional tile dividing method in combination with the present invention.

Since the processing can be executed at high speed without requiring any special parallel operation hardware, the present invention is effective in an application in which encoding and decoding are performed by a medium-speed to low-speed, general-purpose CPU. This makes it possible to implement a low-cost client terminal which receives and displays images across a network, and an inexpensive ubiquitous terminal.

BRIEF DESCRIPTION OF DRAWINGS

FIG. 3 is a flowchart showing encoding control by the encoding device according to the first embodiment of the present invention;

FIG. 5 is a flowchart showing decoding control by the decoding device according to the first embodiment of the present invention;

FIG. 7 is a flowchart showing encoding control by the encoding device according to the first embodiment of the present invention;

BEST MODE FOR CARRYING OUT THE INVENTION

1. First Embodiment 1.1) Encoding Device

Figure 1:
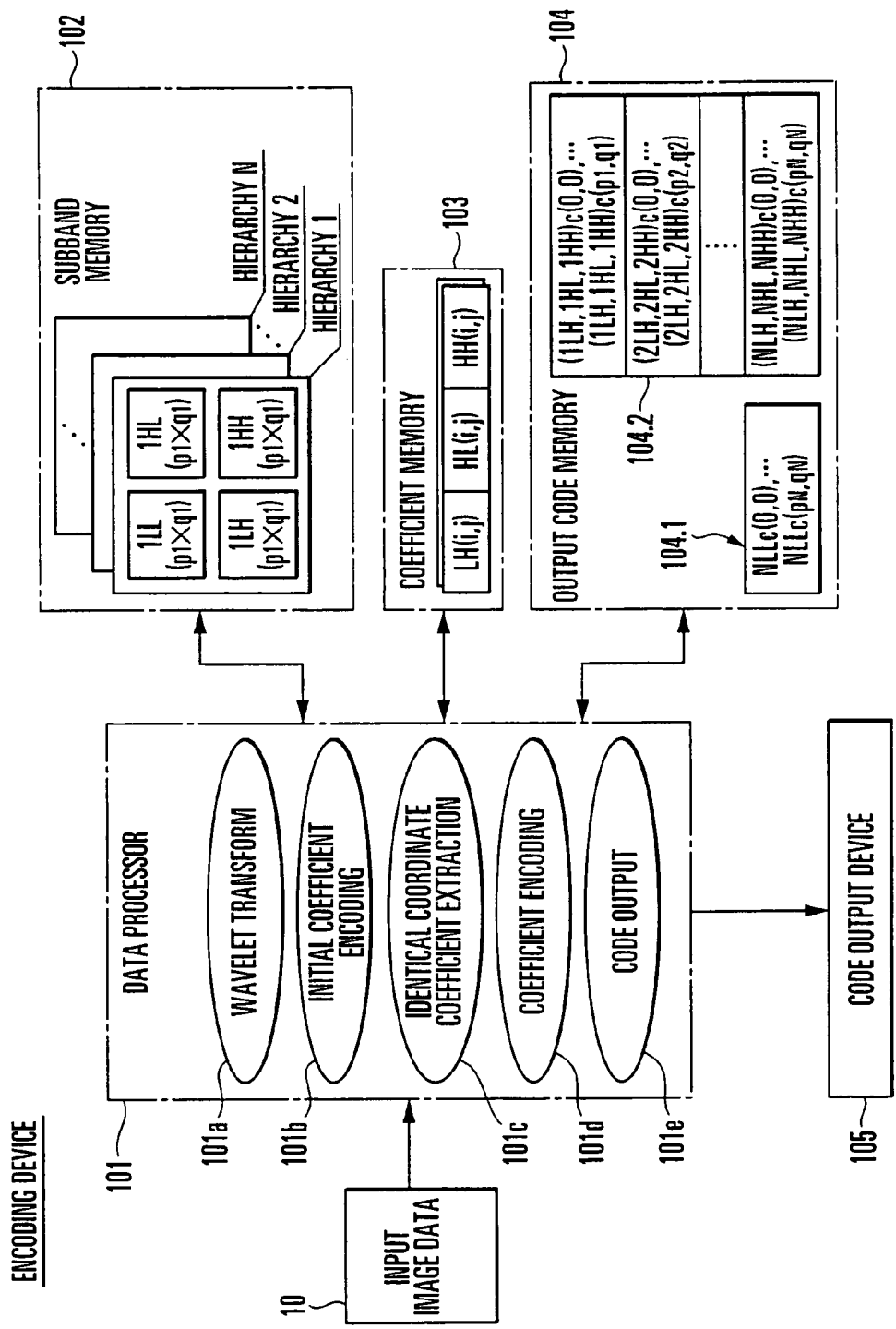
FIG. 1 is a block diagram showing an outline of the arrangement of an encoding device according to the first embodiment of the present invention.

FIG. 1 is a block diagram showing an outline of the arrangement of an encoding device according to the first embodiment of the present invention. This encoding device receives image data 10 from an image input device (not shown), and outputs a code sequence by wavelet encoding (to be described later). The encoding device mainly comprises a data processor 101, subband memory 102, coefficient memory 103, and output code memory 104, and outputs the generated code sequence to a code output device 105.

The data processor 101 is a program control processor such as a general CPU (Central Processing Unit), and can generate a wavelet transform (in this embodiment, two-dimensional Haar wavelet transform) process (wavelet transforming means 101a), an initial coefficient encoding process (initial coefficient encoding means 101b), an identical coordinate coefficient extraction process (identical coordinate coefficient extracting means 101c), a coefficient encoding process (coefficient encoding means 101d), and a code output process (code output means 101e) by reading out encoding programs from a program memory (not shown) and executing the read-out programs (details will be described later).

The subband memory 102, coefficient memory 103, and output code memory 104 can be formed by discrete memories, and can also be formed by allocating the individual spaces in one semiconductor memory. A space for storing the input image data 10 may also be formed in this semiconductor memory. Note that in the present invention, a register or cache memory of the CPU can be used as the coefficient memory 103 as will be described later.

The subband memory 102 stores subband data (nLL, nLH, nHL, and nHH) ($1 \leq n \leq N$) of N (an integer of 1 or more) hierarchies obtained by performing two-dimensional Haar wavelet transform on the input image data 10. For convenience of explanation, assume that the subbands nLL, nLH, nHL, and nHH of a hierarchy n have a $p_n \times q_n$ (p and q are integers) coefficient matrix corresponding to spatial coordinates (x,y) of an image. Accordingly, each of the subband data nLL, nLH, nHL, and nHH of each hierarchy is a two-dimensional signal.

The coefficient memory 103 stores a set of coefficients {LH(i,j),HL(i,j),HH(i,j)} at identical spatial coordinates (i,j) in the subbands nLH, nHL, and nHH of one hierarchy sequentially extracted from the subband memory 102 by the identical coordinate coefficient extraction process of the data processor 101. The coefficient set extraction order is the scan line direction from the upper left end to the lower right end. It is also possible to sequentially extract a predetermined number of two or more coefficient sets. For example, one or more coefficient sets adjacent to {LH(i,j),HL(i,j),HH(i,j)} may also be extracted and stored in the coefficient memory 103. As described above, when a cache memory of the CPU is used as the coefficient memory 103, a plurality of sets of coefficients can be stored if the cache memory has a free space.

The output code memory 104 has an NLL subband code memory 104.1 and (nLH,nHL,nHH) subband code memory 104.2. The NLL subband code memory 104.1 stores a subband code NLLc obtained by encoding a subband NLL of a hierarchy N by the initial coefficient encoding process of the data processor 101. The (nLH,nHL,nHH) subband code memory 104.2 stores a code (nLH,nHL,nHH)c obtained by encoding, by the coefficient encoding process, a set of identical coordinate coefficients sequentially read out to the coefficient memory 103.

(Memory Data Configuration)

An example of the data configuration of the subband memory 102 and output code memory 104 will be explained below. In this embodiment, a case in which a set of coefficients {LH(i,j),HL(i,j),HH(i,j)} at identical spatial coordinates (i,j) are stored in the coefficient memory 103 and encoded will be described.

Figure 2A:
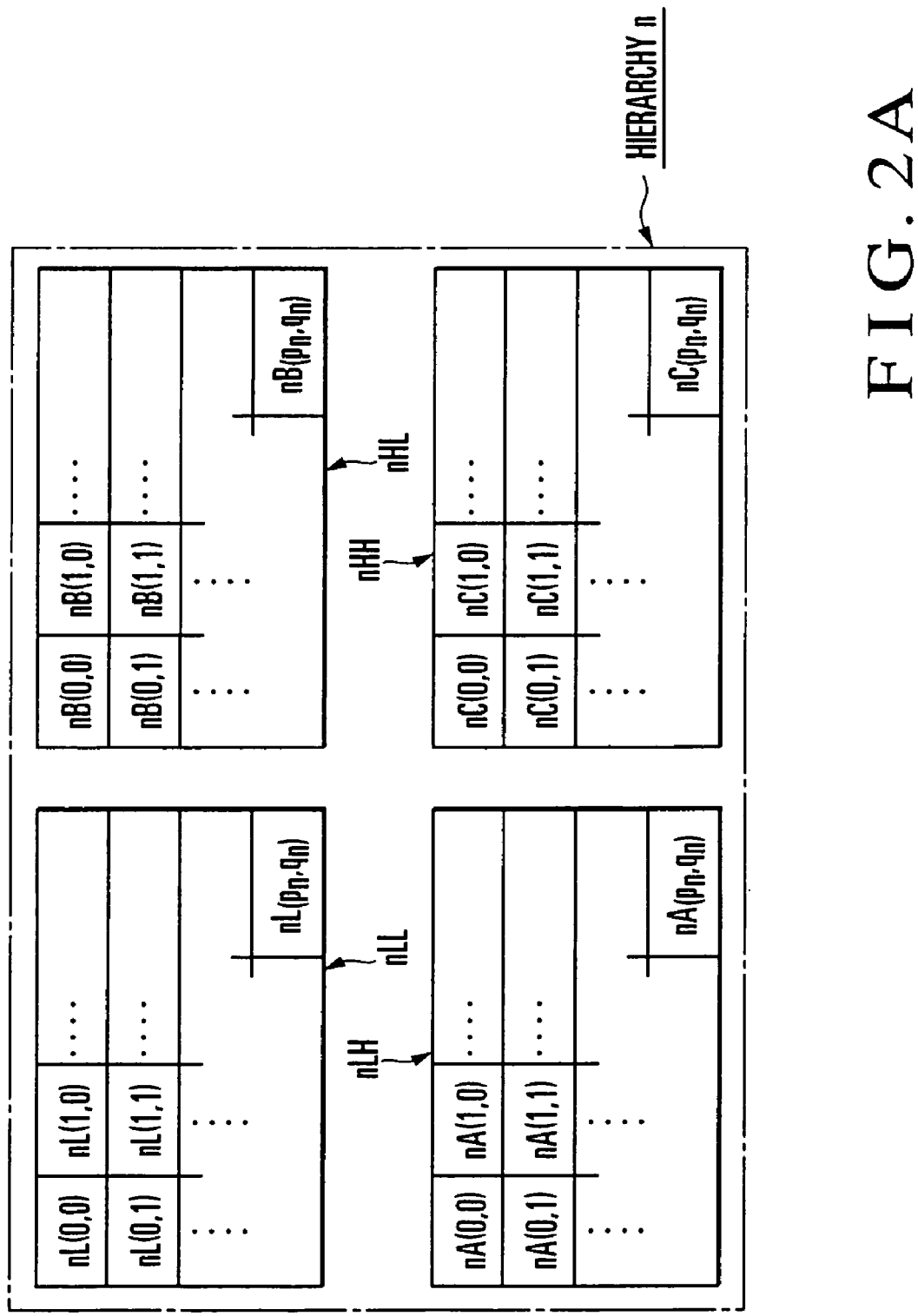
FIG. 2A is a schematic view showing an example of a coefficient arrangement in subbands nLL, nLH, nHL, and nHH in a subband memory 102.
Figure 2B:
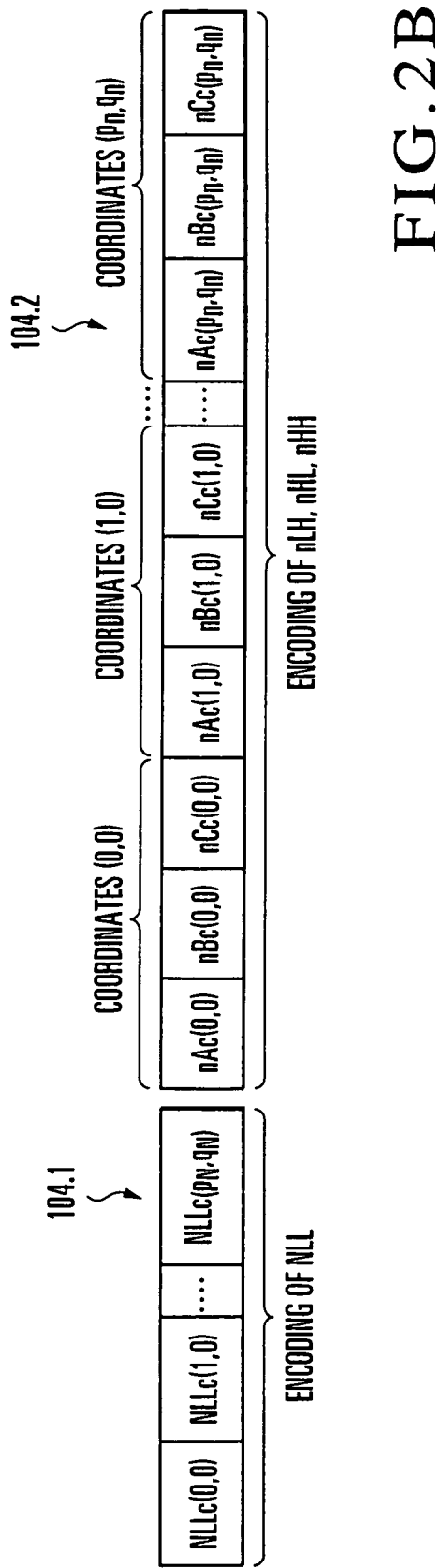
FIG. 2B is a schematic view showing an example of a code arrangement in an output code memory 104.

FIG. 2A is a schematic view showing an example of the coefficient arrangement of the subbands nLL, nLH, nHL, and nHH in the subband memory 102, and FIG. 2B is a schematic view showing an example of the code array in the output code memory 104.

Referring to FIG. 2A, in the hierarchy n obtained by two-dimensional Haar wavelet transform, the coefficient array of the subband nLL is nL(0,0), nL(1,0), . . . , nL($p_n,q_n$), the coefficient array of the subband nLH is nA(0,0), nA(1,0), . . . , nA($p_n,q_n$), the coefficient array of the subband nHL is nB(0,0), nB(1,0), . . . , nB($p_n,q_n$), and the coefficient array of the subband nHH is nC(0,0), nC(1,0), . . . , nC($p_n,q_n$). Each coefficient array corresponds to coordinates (0,0), . . . , (i,j), . . . , ($p_n,q_n$) indicating spatial positions in an image.

Referring to FIG. 2B, codes NLLc(0,0), NLLc(1,0), . . . , NLLc($p_N,q_N$) obtained by encoding the coefficients NL(0,0), NL(1,0), . . . , NL($p_N,q_N$) of the above-mentioned subband NLL by the initial encoding process are stored in the NLL subband code memory 104.1. As the encoding method of the initial encoding process, DPCM (Differential Pulse Code Modulation) Huffman coding which encodes the difference between adjacent coefficients can be used.

Also, codes (nLHc,nHLc,nHHc) obtained by encoding, one after another by the coefficient encoding process, one or a plurality of sets (nLH,nHL,nHH) of identical coordinate coefficients sequentially read out to the coefficient memory 103 are stored in the (nLH,nHL,nHH) subband code memory 104.2. The encoding method of the coefficient encoding process can use, e.g., a runlength Huffman code using the number of consecutive zero values and the values of non-zero coefficients, or LZW (Lempel-Ziv-Welch) code.

In the example of the subband data shown in FIG. 2A, the coefficients nA(0,0), nB(0,0), and nC(0,0) having the same coordinates (0,0) in the subbands nLH, nHL, and nHH of the hierarchy n are collectively read out to the coefficient memory 103, and nAc(0,0), nBc(0,0), and nCc(0,0) encoded by the coefficient encoding process are stored in the subband code memory 104.2. Subsequently, the coefficients nA(1,0), nB(1,0), and nC(1,0) having the same coordinates (1,0) are collectively read out to the coefficient memory 103, and nAc(1,0), nBc(1,0), and nCc(1,0) encoded by the coefficient encoding process are stored in the subband code memory 104.2. After that, all coefficients up to the coordinates $(p_n, q_n)$ are similarly encoded and stored in the subband code memory 104.2.

In an example in which two sets of coefficients are read out to the coefficient memory 103, it is possible to collectively read out, to the coefficient memory 103, the coefficients nA(0, 0), nB(0,0), nC(0,0) having the same coordinates (0,0) and the coefficients nA(1,0), nB(1,0), and nC(1,0) having the same coordinates (1,0) in the subbands nLH, nHL, and nHH of the hierarchy n, and store the codes nAc(0,0), nBc(0,0), and nCc(0,0) and the codes nAc(1,0), nBc(1,0), and nCc(1,0) in the subband code memory 104.2 by similar encoding. In this case, coefficients having the same coordinates (2,0) and (3,0) in the subbands nLH, nHL, and nHH are read out next to the coefficient memory 103. After that, coefficient sets are similarly read out two by two. The same processing is generally applicable to a case in which a predetermined number of two or more coefficient sets are read out.

The subband codes NLLc, nLHc, nHLc, and nHHc thus stored in the output code memory 104 are output to the code output device 105. The code output device 105 is a drive which records information on an optical recording medium such as a DVD, or a network interface connected to a network.

(Encoding Control)

FIG. 3 is a flowchart showing encoding control in this embodiment.

First, the image data 10 is input from an image input device such as a camera or scanner, and stored in an image memory (step S11).

Then, the wavelet transform process on the data processor 101 executes N-stage two-dimensional Haar wavelet transform on the image data 10 read out from the image memory, and stores the transform results in the subband memory 102 as described above (step S12).

When this two-dimensional Haar wavelet transform is completed, the initial coefficient encoding process reads out the initial coefficient NLL from the subband memory of the hierarchy N, performs variable-length coding by using a run-length Huffman code or LZW code, and stores the codes NLLc(0,0), NLLc(1,0), . . . , NLLc($p_N$, $q_N$) in the NLL subband code memory 104.1 of the output code memory 104 (step S13).

When the initial coefficient encoding is completed, the LH, HL, and HH subbands are encoded next. First, a variable n indicating the resolution level (hierarchy) is set to N to set the subbands LH, HL, and HH of the hierarchy N as objects of encoding (n=N), and the identical coordinate coefficient extraction process initializes the spatial coordinates (x,y) of coefficients to be extracted from the subbands nLH, nHL, and nHH to the origin (i=j=0) (step S14).

Subsequently, the identical coordinate coefficient extraction process reads out, from the subband memory 102, a set of coefficients {nA(i,j),nB(i,j),nC(i,j)} at identical spatial coordinates (ij) in the subbands nLH, nHL, and nHH of the hierarchy n, and stores the readout coefficient set in the coefficient memory 103 (step S15). However, it is also possible to read out a predetermined number of two or more coefficient sets as described previously. For example, a predetermined number of coefficient sets corresponding to identical spatial coordinates (i,j), (i+1,j), . . . are read out. When one or a plurality of coefficient sets are read out to the coefficient memory 103, the coefficient encoding process starts to perform encoding.

The coefficient encoding process reads out the set of coefficients nA(i,j), nB(i,j), and nC(i,j) from the coefficient memory 103, performs variable-length coding on the readout coefficients, and stores the codes in the subband code memory 104.2 of the output code memory 104 (step S16). When the encoding of the coefficient set read out to the coefficient memory 103 is completed, the identical coordinate coefficient extraction process checks whether encoding at all coordinates in the hierarchy n is completed (step S17).

If encoding at all coordinates in the hierarchy n is not completed (NO in step S17), the extraction coordinates (i,j) are shifted by a predetermined number in the scan line direction (step S18), and steps S15 to S18 described above are repeated until encoding at all coordinates in the hierarchy n is completed.

If encoding at all coordinates in the hierarchy n is completed (YES in step S17), whether the present hierarchy n has reached n=1 as the maximum resolution is checked (step S19). If n has not reached 1 (NO in step S19), n is decremented by 1 (step S20), and the spatial coordinates (x,y) of coefficients to be extracted from the subbands nLH, nHL, and nHH are initialized to the origin (i=j=0) (step S21). Steps S15 to S21 are repeated while the hierarchy n is thus reduced by 1 at a time.

When encoding of the subbands in the hierarchy n=1 as the highest resolution level is completed (YES in step S19), the code output process reads out the code sequences stored in the output code memory 104, and outputs the readout code sequences to the code output device 105 (step S22).

Note that although the codes are output after the overall encoding is completed in the above explanation, it is also possible to perform code output whenever a predetermined amount of codes are stored. The use of this streaming transmission makes it possible to reduce the use amount of the output code memory 104, and decrease the transmission start delay.

Note also that low-frequency components of each resolution are stored in the image memory and in each nLL subband memory in the above explanation, but the present invention is not limited to this storage method. For example, it is also possible to use a method which reduces the memory use amount by sharing these memories.

1.2) Decoding Device

Figure 4:
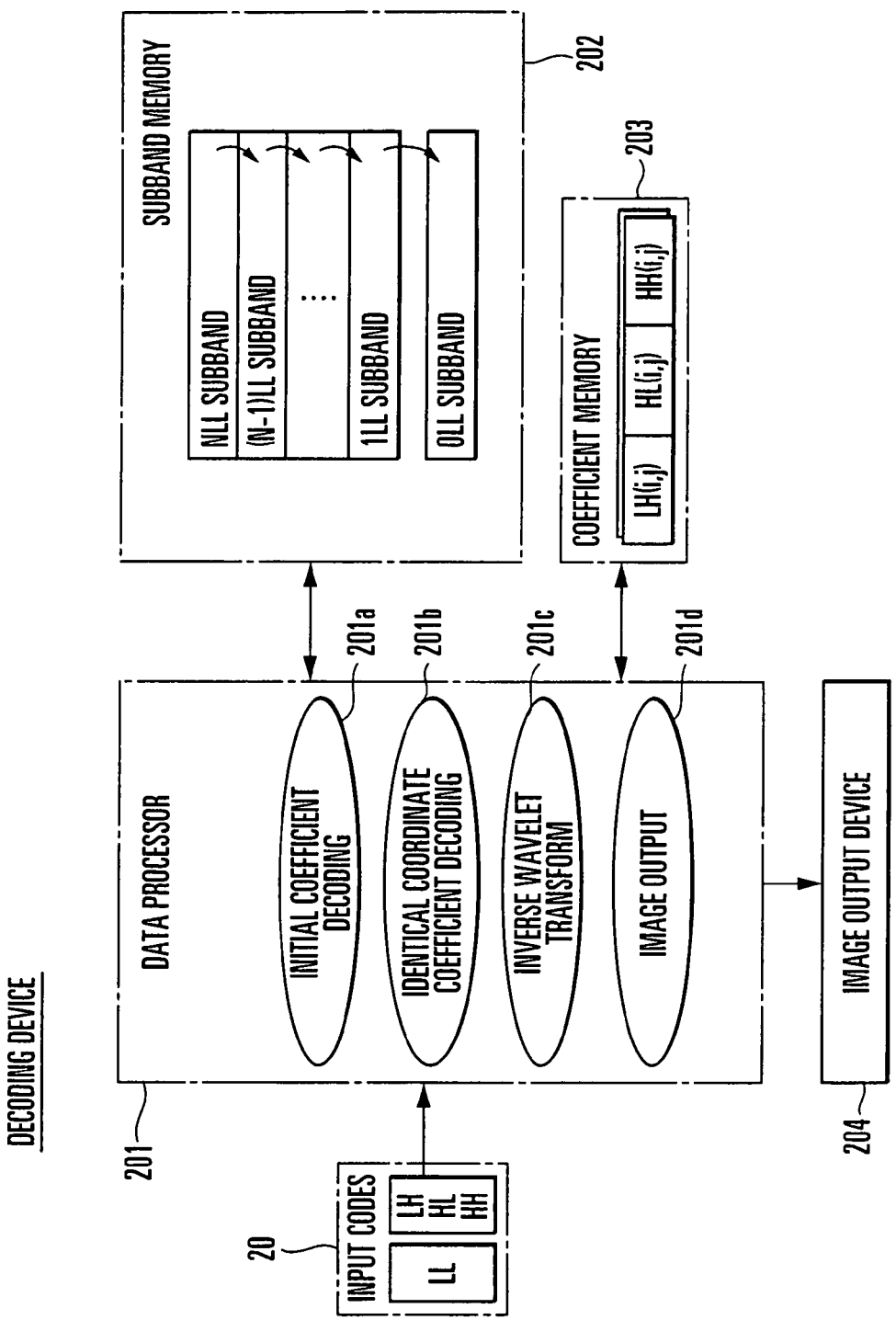
FIG. 4 is a block diagram showing an outline of the arrangement of a decoding device according to the first embodiment of the present invention.

FIG. 4 is a block diagram showing an outline of the arrangement of a decoding device according to the first embodiment of the present invention.

This decoding device receives a code sequence 20 output from the encoding device described above, and outputs the original image data by wavelet decoding (to be described later). The decoding device mainly comprises a data processor 201, subband memory 202, coefficient memory 203, and image output device 204, and the decoded image data is output to the image output device 204.

The data processor 201 is a program control processor such as a CPU as in the encoding device, and can generate an initial coefficient decoding process (initial coefficient decoding means 201a), an identical coordinate coefficient decoding process (identical coordinate coefficient decoding means 201b), an inverse wavelet transform (in this embodiment, a two-dimensional Haar inverse wavelet transform) process (inverse wavelet transforming means 201c), and an image output process (image output means 201d) by reading out decoding programs from a program memory (not shown) and executing the readout programs (details will be described later).

The subband memory 202 and coefficient memory 203 can be formed by discrete memories, and can also be formed by allocating the individual spaces in one semiconductor memory. An input code memory for storing the input code sequence 20 may also be formed in this semiconductor memory. Note that in the present invention, a register or cache memory of the CPU can be used as the coefficient memory 203 as will be described later.

The subband memory 202 stores subband coefficient sequences (N−1)LL, (N−2)LL, ... sequentially generated from an NLL subband coefficient sequence decoded in an initial coefficient decoding step, identical coordinate coefficient decoding step, and inverse wavelet transform step (to be described later). A subband coefficient sequence including the NLL subband coefficient sequence will be generally referred to as an nLL subband coefficient sequence (0≦n≦N).

The coefficient memory 203 stores a set of subband coefficients {LH(i,j),HL(i,j),HH(i,j)} at identical spatial coordinates (i,j) decoded by the identical coordinate coefficient decoding process of the data processor 201. Note that a predetermined number of two or more coefficient sets may also be stored. For example, if one or more coefficient sets adjacent to {LH(i,j),HL(i,j),HH(i,j)} are encoded, a plurality of coefficient sets are decoded and stored in the coefficient memory 203. As described above, when a cache memory of the CPU is used as the coefficient memory 203, a plurality of sets of coefficients can be stored if the cache memory has a free space.

The image output device 204 is a liquid crystal display or the like. The image output process of the data processor 201 displays, on the image output device 204, image data decoded by the initial coefficient decoding process, identical coordinate coefficient decoding process, and inverse wavelet transform process (to be described later).

FIG. 5 is a flowchart showing decoding control of the decoding device according to the first embodiment of the present invention. First, the input variable-length code sequence 20 is stored in an input code memory (step S31).

Then, the initial coefficient decoding process sequentially reads out NLL subband variable-length codes from the input code memory, decodes the readout codes, and stores NLL subband coefficients NL(0,0), NL(0,1), ... as the obtained initial coefficients in the subband memory 202 as described above (step S32).

When this decoding of the NLL subband coefficients is completed, LH, HL, and HH subbands are decoded next. First, the variable n indicating the resolution level (hierarchy) is set to N to set the subbands LH, HL, and HH of the hierarchy N as objects of decoding (n=N), and the identical coordinate coefficient decoding process initializes the spatial coordinates (x,y) of coefficients to be decoded in the subbands nLH, nHL, and nHH to the origin (i=j=0) (step S33).

Subsequently, the identical coordinate decoding process reads out code sequences nAc(i,j), nBc(i,j), nCc(i,j), ... from the input code memory, and stores, in the coefficient memory 203, a set of coefficients {nA(i,j),nB(i,j),nC(i,j)} at identical spatial coordinates (i,j) in the subbands nLH, nHL, and nHH of the hierarchy n (step S34). However, if a plurality of sets of coefficients are encoded as described above, a plurality of sets of coefficients are stored in the coefficient memory 203. When one coefficient set or a predetermined number of two or more coefficient sets are thus stored in the coefficient memory 203, the inverse wavelet transform process immediately performs inverse wavelet transform.

The inverse wavelet transform processing reads out the coefficients nA(i,j), nB(i,j), and nC(i,j) from the coefficient memory 203, and reads out the corresponding nLL subband coefficient nL(i,j) from the subband memory 202 (step S35). The inverse wavelet transform process performs inverse wavelet transform on the readout nL(i,j), nA(i,j), nB(i,j), and nC(i,j), and stores the results as a coefficient (n−1)L(i,j) of an (n−1)LL subband in the subband memory 202 (step S36). Subsequently, the identical coordinate coefficient decoding process checks whether decoding at all coordinates in the hierarchy n is completed (step S37).

If decoding at all coordinates in the hierarchy n is not completed (NO in step S37), the coordinates (i,j) are shifted by a predetermined number in the scan line direction (step S38), and steps S34 to S38 described above are repeated until decoding at all coordinates in the hierarchy n is completed.

If decoding at all coordinates in the hierarchy n is completed (YES in step S37), whether the present hierarchy n has reached a hierarchy $N_D$ corresponding to the resolution to be output is checked (step S39). If n has not reached $N_D$ (NO in step S39), n is decremented by 1 (step S40), and the spatial coordinates (x,y) of coefficients to be extracted from the subbands nLH, nHL, and nHH are initialized to the origin (i=j=0) (step S301). Steps S34 to S40 and S301 are repeated until n reaches $N_D$ while the hierarchy n is thus reduced by 1 at a time.

If the hierarchy n has reached the hierarchy $N_D$ having the resolution to be output (YES in step S39), the image output process reads out the (n−1)LL subband data from the subband memory 202, and outputs the readout data to the image output device 204, thereby displaying an image (step S302).

Subsequently, whether the hierarchy n is n=1 as the maximum resolution is checked (step S303). If the hierarchy n has not reached 1 (NO in step S303), this means that a subband to be decoded remains, so the flow returns to step S40 to repeat steps S34 to S40 and S301 to S303 until the hierarchy n reaches 1. If decoding of subbands in the hierarchy n=1 as the highest resolution level is completed (YES in step S303), the processing is terminated.

Note that decoding is performed after all codes are completely input in the above explanation, but it is also possible to perform decoding whenever a predetermined amount of codes are sequentially input from the initial codes. The use of this streaming transmission makes it possible to reduce the use amount of the input code memory, and decrease the decoding start delay.

Note also that the input code sequences are stored in the input code memory and the nLL subband coefficients are stored in the nLL subband memory in the above explanation, but the present invention is not limited to this storage method. For example, it is also possible to use a method which reduces the memory use amount by sharing portions of these memories.

Furthermore, in this embodiment, codes output by the coefficient encoding process of the encoding device and codes input to the coefficient decoding process of the decoding device may be arranged in the order of:

(a) (Y,Cb,Cr) of the LH coefficient, (Y,Cb,Cr) of the HL coefficient, and (Y,Cb,Cr) of the HH coefficient; or (b) the LH, HL, and HH coefficients of the Y component, the LH, HL, and HH coefficients of the Cb component, and the LH, HL, and HH coefficients of the Cr component.

If the CPU which performs encoding and decoding corresponds to SIMD (Single Instruction stream/Multiple data stream) instruction which applies the same operation to a plurality of data sequences, it is efficient to use code order (a). If the CPU does not correspond to the SIMD instruction and the number of bits of an operation register of the CPU is small, it is efficient to perform an operation on each component of each coefficient in code order (b).

1.3) Effects

In the encoding device and encoding control of the first embodiment, the LH, HL, and HH subband coefficients obtained by wavelet-transforming image data are stored, sets of coefficients corresponding to the same position in the image are sequentially read out and encoded at least set by set, and the codes are stored in the output code memory.

Since sequential encoding is possible, a high-speed register or cache memory of a CPU can be used as the coefficient memory for storing coefficients to be encoded, so the encoding speed can be increased.

In the decoding device and decoding control of the first embodiment, one or a plurality of sets of LH, HL, and HH subband coefficients decoded by the coefficient decoding process and corresponding to the same image position are read out to the coefficient memory which is a high-speed memory such as a register, and immediately inversely wavelet-transformed. Accordingly, it is possible to reduce the number of times of store/load to a real memory by a sequential CPU, and greatly increase the decoding speed.

In addition, since the coefficients at the same image position in the LH, HL, and HH subbands are simultaneously sequentially decoded, these coefficients need not be held until decoding of data of the LH, HL, and HH subbands is completed.

Furthermore, the inverse wavelet transform process successively reads out the LL subband in the scan line order, and successively outputs the operation results onto two scan lines of the nLL subband. This makes it possible to increase the efficiency of the cache memory, and increase the processing speed.

Also, pixels are output not for each block or tile but in the scan line order, so no staircase noise is produced in the boundary between a decoded region and undecoded region even if intermediate results of decoding are displayed.

2. Second Embodiment

2.1) Encoding Device

Figure 6:
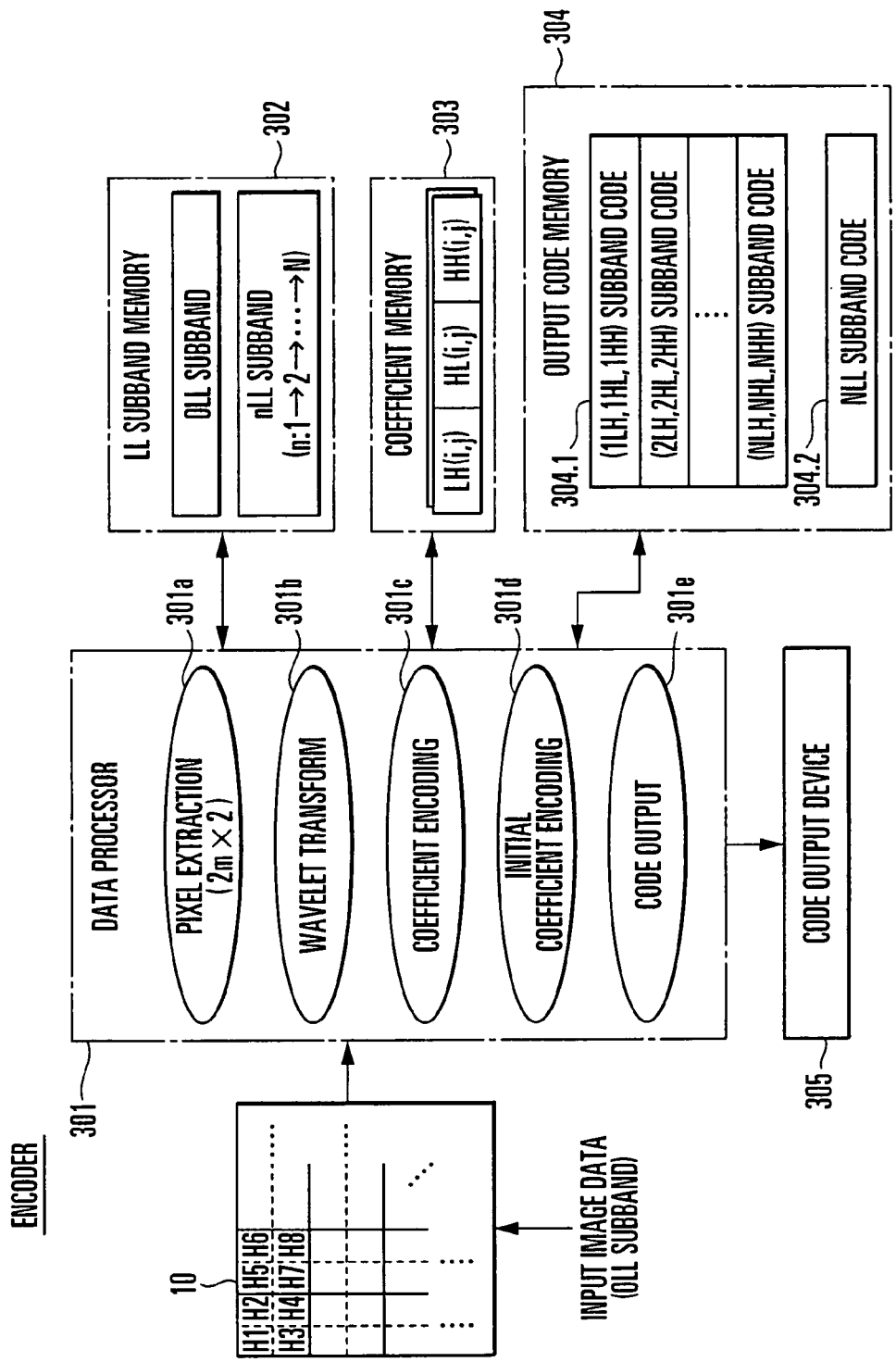
FIG. 6 is a block diagram showing an outline of the arrangement of an encoding device according to the second embodiment of the present invention.

FIG. 6 is a block diagram showing an outline of the arrangement of an encoding device according to the second embodiment of the present invention. This encoding device receives image data 10 as a representative example of a two-dimensional signal from an image input device (not shown), and outputs a code sequence by wavelet encoding (to be described later). The encoding device mainly comprises a data processor 301, LL subband memory 302, coefficient memory 303, and output code memory 304, and outputs the generated code sequence to a code output device 305.

The data processor 301 is a program control processor such as a general CPU, and can generate a pixel extraction process (pixel extracting (element extracting) means 301a), a wavelet transform (in this embodiment, two-dimensional Haar wavelet transform) process (wavelet transforming means 301b), a coefficient encoding process (coefficient encoding means 301c), an initial coefficient encoding process (initial coefficient encoding means 301d), and a code output process (code output means 301e) by reading out encoding programs from a program memory (not shown) and executing the readout programs (details will be described later).

The LL subband memory 302, coefficient memory 303, and output code memory 304 may be formed by discrete memories, and may also be formed by allocating the individual spaces in one semiconductor memory. Note that in the present invention, a register or cache memory of the CPU can be used as the coefficient memory 303 as will be described later.

The LL subband memory 302 stores the input image data 10 as 0LL subband data, and also sequentially stores nLL subband coefficients ($1 \leq n \leq N$) obtained by performing two-dimensional Haar wavelet transform on partial regions (2 m×2) sequentially extracted by the pixel extraction process, thereby finally storing NLL subband coefficients. In the encoding device according to the second embodiment, the pixel extraction process sequentially extracts spatially adjacent 2 m×2-pixel partial regions from (n−1)LL subband coefficients, and executes two-dimensional Haar wavelet transform on the extracted partial regions, thereby obtaining nLL subband coefficients. The 2 m×2 partial regions are extracted along the scan line direction from the upper left end to the lower right end of the image.

The coefficient memory 303 stores a set of coefficients {LH(i,j),HL(i,j),HH(i,j)} at identical spatial coordinates (i,j) in subbands nLH, nHL, and nHH of one hierarchy obtained by two-dimensional Haar wavelet transform. Note that a predetermined number of two or more coefficient sets may also be stored. As described above, when a cache memory of the CPU is used as the coefficient memory 303, a plurality of sets of coefficients can be stored if the cache memory has a free space.

The output code memory 304 has an (nLH,nHL,nHH) subband code memory 304.1 and an NLL subband code memory 304.2 for an initial output code. The (nLH,nHL, nHH) subband code memory 304.1 stores a code (nLH,nHL, nHH)c obtained by encoding, by the coefficient encoding process, a set of identical coordinate coefficients sequentially read out to the coefficient memory 303. The NLL subband code memory 304.2 stores a subband code NLLc obtained by encoding the NLL subband coefficient by the initial coefficient encoding process of the data processor 301.

(Encoding Control)

FIG. 7 is a flowchart showing encoding control in this embodiment.

First, the image data 10 is input from an image input device such as a camera or scanner, and stored as a 0LL subband in the LL subband memory 302 (step S41).

The pixel extraction process on the data processor 301 sets a variable n indicating the resolution level (hierarchy) to 1, and initializes the spatial coordinates (x,y) of coefficients to be extracted from the subbands nLH, nHL, and nHH to the origin (i=j=0) (step S42).

Subsequently, the pixel extraction process sequentially extracts spatially adjacent 2 m×2-pixel partial regions corresponding to the coordinates (i,j) from the (n−1)LL subband in the LL subband memory 302 (step S43). For example, when n=1, m=1, and i=j=0, as shown in FIG. 6, the upper left 2×2 partial region (H1, H2, H3, and H4) is extracted from the 0LL subband (input image data 10).

The wavelet transform process executes two-dimensional Haar wavelet transform on the extracted 2 m×2 partial region (step S44), stores an LH coefficient nA(i,j), HL coefficient nB(i,j), and HH coefficient nC(i,j) obtained by the transform into the coefficient memory 303, and stores an LL coefficient nL(i,j) as an nLL subband in the LL subband memory 302 (step S45).

Subsequently, the wavelet transform process calls the coefficient encoding process, and the coefficient encoding process reads out the set of coefficients nA(i,j), nB(i,j), and nC(i,j) from the coefficient memory 303, performs variable-length coding on the readout coefficients, and stores the codes in the subband code memory 304.1 of the output code memory 304 (step S46). When this encoding of the coefficient set read out from the coefficient memory 303 is completed, the pixel extraction process checks whether encoding at all coordinates in the hierarchy n is completed (step S47).

If encoding at all coordinates in the hierarchy n is not completed (NO in step S47), the extraction coordinates (i,j) are shifted by a predetermined number in the scan line direction (step S48), and steps S42 to S48 described above are repeated until encoding at all coordinates in the hierarchy n is completed.

If encoding at all coordinates in the hierarchy n is completed (YES in step S47), whether the present hierarchy n is a hierarchy N having the lowest resolution level is checked (step S49). If n has not reached N (NO in step S49), n is incremented by 1, and the spatial coordinates (x,y) are initialized to the origin (i=j=0) (step S50). Steps S43 to S50 are repeated while the hierarchy n is thus increased by 1 at a time.

If encoding of the subbands of the lowest resolution level N is completed (YES in step S49), the initial coefficient encoding process starts to encode the NLL subband coefficients stored in the LL subband memory 302, and store the codes in the NLL subband code memory 304.2 of the output code memory 304 (step S401).

Subsequently, the code output process sets the hierarchy n to be output to the lowest resolution level N (step S402), reads out the codes of the hierarchy n in ascending order of resolution from the subband code memory 304.1 and NLL subband code memory 304.2 of the output code memory 304, and outputs the readout codes (steps S403 to S405). That is, when the subband codes of the hierarchy n are output (step S403), the code output process checks whether the hierarchy n has reached the highest resolution level n=1 (step S404). If the hierarchy n has not reached 1 (NO in step S404), the hierarchy n is reduced by 1 (step S405), and the flow returns to step S403. Steps S403 to S405 are thus repeated until n=1, thereby sequentially outputting all codes.

As described above, the pixel extraction process can extract 2 m×2 partial regions. The value of m can be determined in accordance with the CPU. For example, if the CPU supports the SIMD instruction which applies the same operation to a plurality of data sequences, it is possible to extract partial regions in units of 4×2 by setting, e.g., m=2, and simultaneously perform a plurality of wavelet operations, thereby increasing the operation efficiency.

Note that low-frequency components of each resolution are stored in the nLL subband memory in the above explanation, but the present invention is not limited to this storage method. For example, it is also possible to use a method which reduces the memory use amount by sharing these storage units.

2.2) Decoding Device

The codes output by the encoding method of this embodiment can be decoded by the decoding method of the first embodiment shown in FIGS. 4 and 5, so a detailed explanation thereof will be omitted.

2.3) Effects

In the encoding device and encoding control according to this embodiment, after the wavelet operation is performed on 2 m×2-pixel regions extracted by the pixel extraction process, the LH, HL, HH coefficients are immediately encoded on the small-scale, high-speed memory (coefficient memory 303) such as a register. This makes high-speed encoding feasible, and obviates the need for a real memory for storing the LH, HL, and HH subbands.

Note that in this embodiment, no streaming transmission is possible because all output codes must be temporarily stored until code output is started. This increases the memory (output code memory 304) for temporary storage, compared to the case in which streaming transmission is performed in the first embodiment. Since, however, the redundancy of these codes is reduced by variable-length coding, the entire memory capacity can be made smaller than that in the first embodiment in which subbands are directly stored.

2.4) Practical Examples

Practical examples of the first and second embodiments described above will be explained below with reference to the accompanying drawing.

Figure 8:
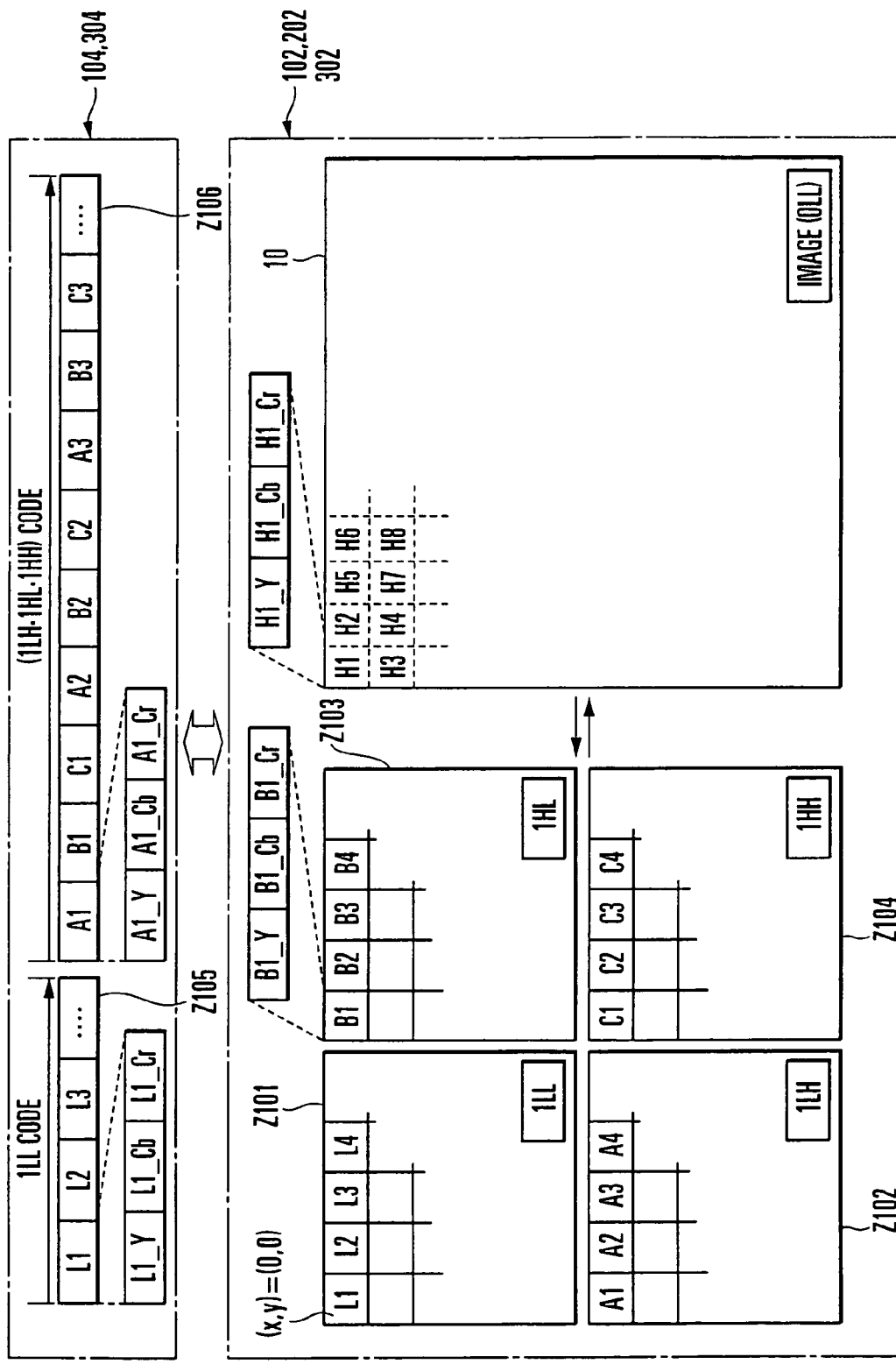
FIG. 8 is a view schematically showing encoding and decoding operations according to the first and second embodiments of the present invention.

FIG. 8 is a view schematically showing the encoding and decoding operations according to the first and second embodiments of the present invention. Assume that this practical example uses a video camera as the image input device, personal computers as the data processors 101, 201, and 301, semiconductor memories (included in the personal computers) as the data storage devices 102 to 104, 202, 203, and 302 to 304, and wired or wireless network communication controllers as the code output devices 105 and 305.

In the encoding device, the personal computer has a CPU which implements the functions of image input, wavelet operation, initial coefficient encoding, coefficient extraction, coefficient encoding, and code output.

First, when the input image 10 represented by a luminance/color difference space is given from the video camera, the image input process stores image data (0LL) in the semiconductor memory. The stored image 10 has pixels H1, H2, . . . , and each pixel is formed by numerical value data (H1#Y, H1#Cb, H1#Cr, . . . ) of Y, Cb, and Cr.

The input image 10 undergoes two-dimensional Haar wavelet transform by the wavelet operation, and the results are stored as nLL, nLH, nHL, and nHH subband coefficients Z101, Z102, Z103, and Z104 in the semiconductor memory. More specifically, the wavelet operation is first performed on the Y, Cb, and Cr components of the pixels H1, H2, H3, and H4 in order from the origin at the upper left end, and the coefficient values of Y, Cb, and Cr are written in L1, A1, B1, and C1. Then, the wavelet operation is performed on the Y, Cb, and Cr components of the pixels H5, H6, H7, and H8, and the coefficient values of Y, Cb, and Cr are written in L2, A2, B2, and C2. The above processing is repeated to the lower right end of the image. The wavelet transform described above is repeated for the LL subband, thereby forming multiple-resolution data.

When the wavelet transform is completed, the initial coefficient encoding process sequentially reads out the coefficient values from the original (x,y)=(0,0) of the LL subband (1LL subband in FIG. 8) having the resolution level N as the lowest resolution, and performs variable-length coding on the readout coefficient values. A code Z105 obtained by this processing is stored in the 1LL code memory shown in FIG. 8.

In addition, the LH, HL, and HH subbands are encoded in order from the resolution level N. In this encoding of the LH, HL, and HH subbands, coefficients corresponding to the spatial coordinates are sequentially extracted in order from the origin, and encoded by variable-length coding. More specifically, the coefficients A1, B1, and C1 corresponding to (x,y)=(0,0) are extracted by the coefficient extraction process, and encoded by variable-length coding by the coefficient encoding process.

Then, the coefficients A2, B2, and C2 corresponding to (x,y)=(1,0) are extracted and encoded. The above processing is performed to the lower right end of the subband, and an obtained code Z106 is stored in the (LH,HL,HH) code memory.

Finally, the code output process sequentially outputs the contents of the LL code memory and (LH,HL,HH) code memory to a communication path.

In the decoding device, the personal computer has a CPU which implements the functions of code input, initial coefficient decoding, coefficient decoding, inverse wavelet operation, and image output.

When the codes are supplied from the communication path, the code input process stores the code data Z105 and Z106 in the semiconductor memory. In the example shown in FIG. 8, the 1LL code and (1LH,1HL,1HH) code are stored.

The input code Z105 is decoded by the initial coefficient decoding process, and the result is output to the LL subband memory in the semiconductor memory.

Then, the (LH,HL,HH) code data Z106 is sequentially supplied to the coefficient decoding process, and the coefficient values are decoded. Subsequently, a two-dimensional Haar inverse wavelet operation is performed on a set of the decoded coefficients and the coefficients in the LL subband memory by the inverse wavelet operation process, and the results are output to the 0LL subband memory. More specifically, after the coefficient values A1, B1, and C1 are sequentially decoded, an inverse wavelet operation is performed using the coefficient values L1, A1, B1, and C1, and the operation results are output to H1, H2, H3, and H4. Then, after the coefficient values A2, B2, and C2 are sequentially decoded, an inverse wavelet operation is performed using the coefficient values L2, A2, B2, and C2, and the operation results are output to H5, H6, H7, and H8. The above processing is repeated to the end of the subband.

If high-resolution subband codes exist, the inverse wavelet transform described above is repetitively applied, and multiple-resolution images are sequentially decoded.

When decoding of the subband of each resolution level is completed, the image output process outputs the image to the liquid crystal display.

A second practical example of the encoding method of the present invention will be explained below with reference to FIG. 8. Note that the personal computer of this practical example has a CPU which implements the functions of image input, pixel extraction, wavelet operation, coefficient encoding, initial coefficient encoding, and code output.

When the image 10 represented by a luminance/color difference space is given as an input image from the video camera, the image input process stores the image data in the semiconductor memory.

The input image 10 is extracted by extracting 2×2 pixels at a time by the pixel extraction process, and the extracted pixels are supplied to the wavelet operation process in which the wavelet operation and encoding are performed. More specifically, the pixels H1, H2, H3, and H4 are first supplied to the wavelet operation process and encoded, and then the pixels H5, H6, H7, and H8 are supplied to the wavelet operation process and encoded. When 2×2 pixels are supplied, the wavelet operation process performs two-dimensional Haar wavelet transform on these pixels, thereby obtaining the coefficients L1, A1, B1, and C1. The coefficient encoding process sequentially encodes A1, B1, and C1, and stores the (LH,HL, HH) code Z106 in the output code memory.

The above processing is repeated to the end of the image. Also, the wavelet operation and encoding are repetitively applied to the thus generated nLL subbands, thereby generating multiple-resolution codes.

Then, the initial coefficient encoding process sequentially reads out the coefficient values from the origin (x,y)=(0,0) of the LL subband (1LL subband memory in FIG. 8) having the resolution level N as the lowest resolution, and performs variable-length coding on the readout coefficient values. The obtained codes are stored in the 1LL code memory in FIG. 8.

Finally, the code output process rearranges the code data stored in the semiconductor memory in order from the resolution level N, and sequentially outputs the data in the LL code memory and (LH,HL,HH) code memory to the communication path.

3. Third Embodiment

3.1) Encoding Device

Figure 9:
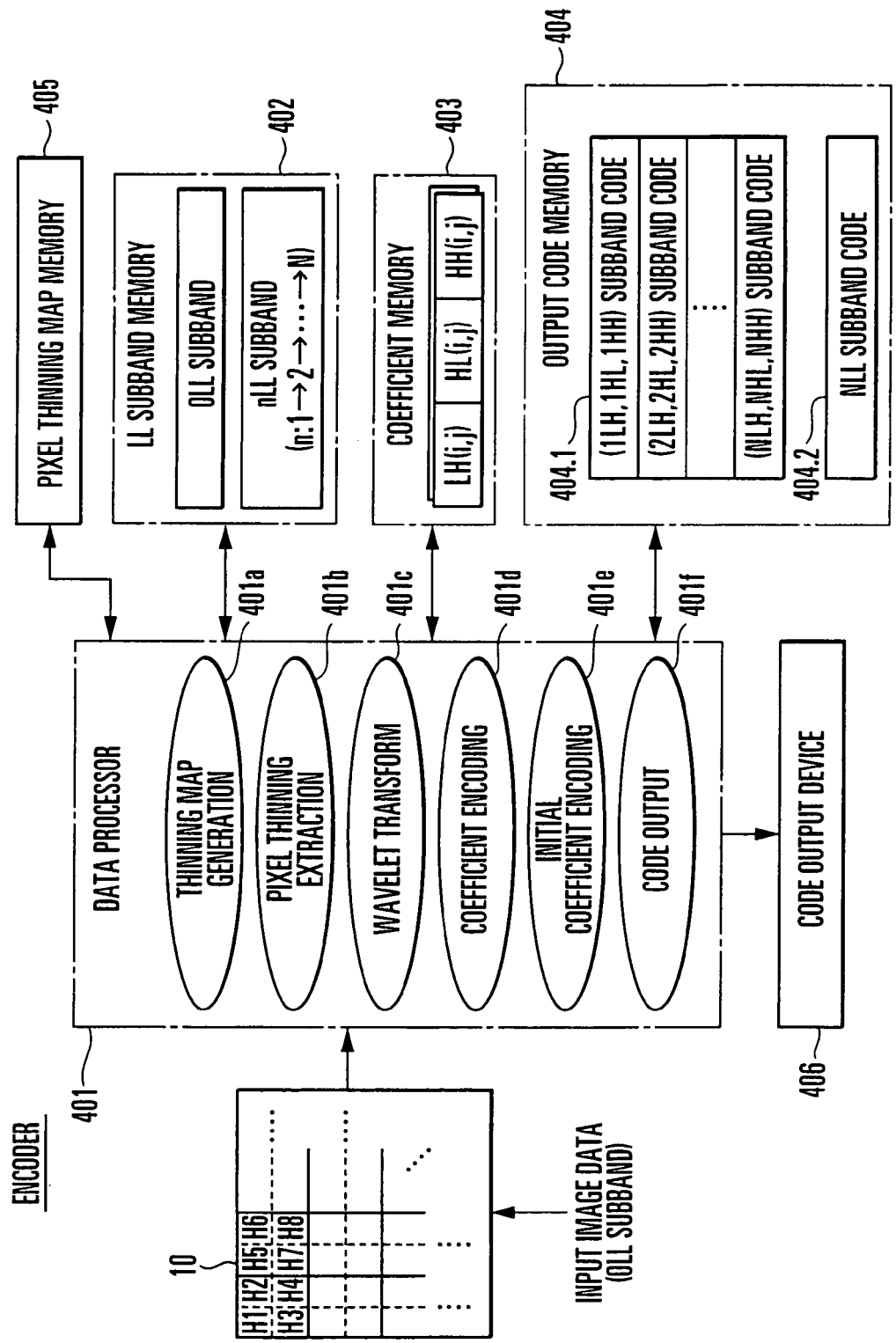
FIG. 9 is a block diagram showing an outline of the arrangement of an encoding device according to the third embodiment of the present invention.

FIG. 9 is a block diagram showing an outline of the arrangement of an encoding device according to the third embodiment of the present invention. This encoding device receives image data 10 as a representative example of two-dimensional signals from an image input device (not shown), and outputs a code sequence by wavelet encoding (to be described later). The encoding device mainly comprises a data processor 401, LL subband memory 402, coefficient memory 403, output code memory 404, and pixel thinning map memory 405, and outputs the generated code sequence to a code output device 406.

The data processor 401 is a program control processor such as a general CPU, and can generate a pixel thinning map generation process (pixel thinning map generating means 401a), a pixel thinning extraction process (pixel thinning extracting means 401b), a wavelet transform (in this embodiment, two-dimensional Haar wavelet transform) process (wavelet transforming means 401c), a coefficient encoding process (coefficient encoding means 401d), initial coefficient encoding (initial coefficient encoding means 401e), and a code output process (code output means 401f) by reading out encoding programs from a program memory (not shown) and executing the readout programs (details will be described later).

The LL subband memory 402, coefficient memory 403, output code memory 404, and pixel thinning map memory 405 may be formed by discrete memories, and may also be formed by allocating the individual spaces in one semiconductor memory. Note that in the present invention, a register or cache memory of the CPU can be used as the coefficient memory 403 as will be described later.

The LL subband memory 402 stores the input image data 10 as 0LL subband data, and also sequentially stores nLL subband coefficients ($1 \leq n \leq N$) obtained by performing two-dimensional Haar wavelet transform on partial regions (2 m×2) sequentially extracted by the pixel thinning extraction process, thereby finally storing NLL subband coefficients. In the encoding device according to the third embodiment, the pixel thinning extraction process sequentially extracts 2 m×2-pixel partial regions from (n−1)LL subband coefficients, thins the extracted partial regions, and executes two-dimensional Haar wavelet transform on the results, thereby obtaining nLL subband coefficients. The 2 m×2-pixel partial regions are sequentially extracted in the scan line direction.

The coefficient memory 403 stores a set of coefficients {LH(i,j),HL(i,j),HH(i,j)} at identical spatial coordinates (i,j) in subbands nLH, nHL, and nHH of one hierarchy obtained by two-dimensional Haar wavelet transform. Note that a predetermined number of two or more coefficient sets may also be stored. For example, one or more coefficient sets adjacent to {LH(i,j),HL(i,j),HH(i,j)} may also be extracted and stored in the coefficient memory 403. As described above, when a cache memory of the CPU is used as the coefficient memory 403, a plurality of sets of coefficients can be stored if the cache memory has a free space.

The output code memory 404 has an (nLH,nHL,nHH) subband code memory 404.1 and an NLL subband code memory 404.2 for an initial output code. The (nLH,nHL, nHH) subband code memory 404.1 stores a code (nLH,nHL, nHH)c obtained by encoding, by the coefficient encoding process, a set of identical coordinate coefficients sequentially read out to the coefficient memory 403. The NLL subband code memory 404.2 stores a subband code NLLc obtained by encoding an NLL subband coefficient by the initial coefficient encoding process of the data processor 401.

The pixel thinning map memory 405 is generated by the pixel thinning map generation process (to be described later), and stores the resolution level of each portion of an image. By searching the pixel thinning map memory 405, therefore, whether to perform a pixel thinning process on an extracted partial region can be determined (details will be explained later).

(Encoding Control)

Figure 10:
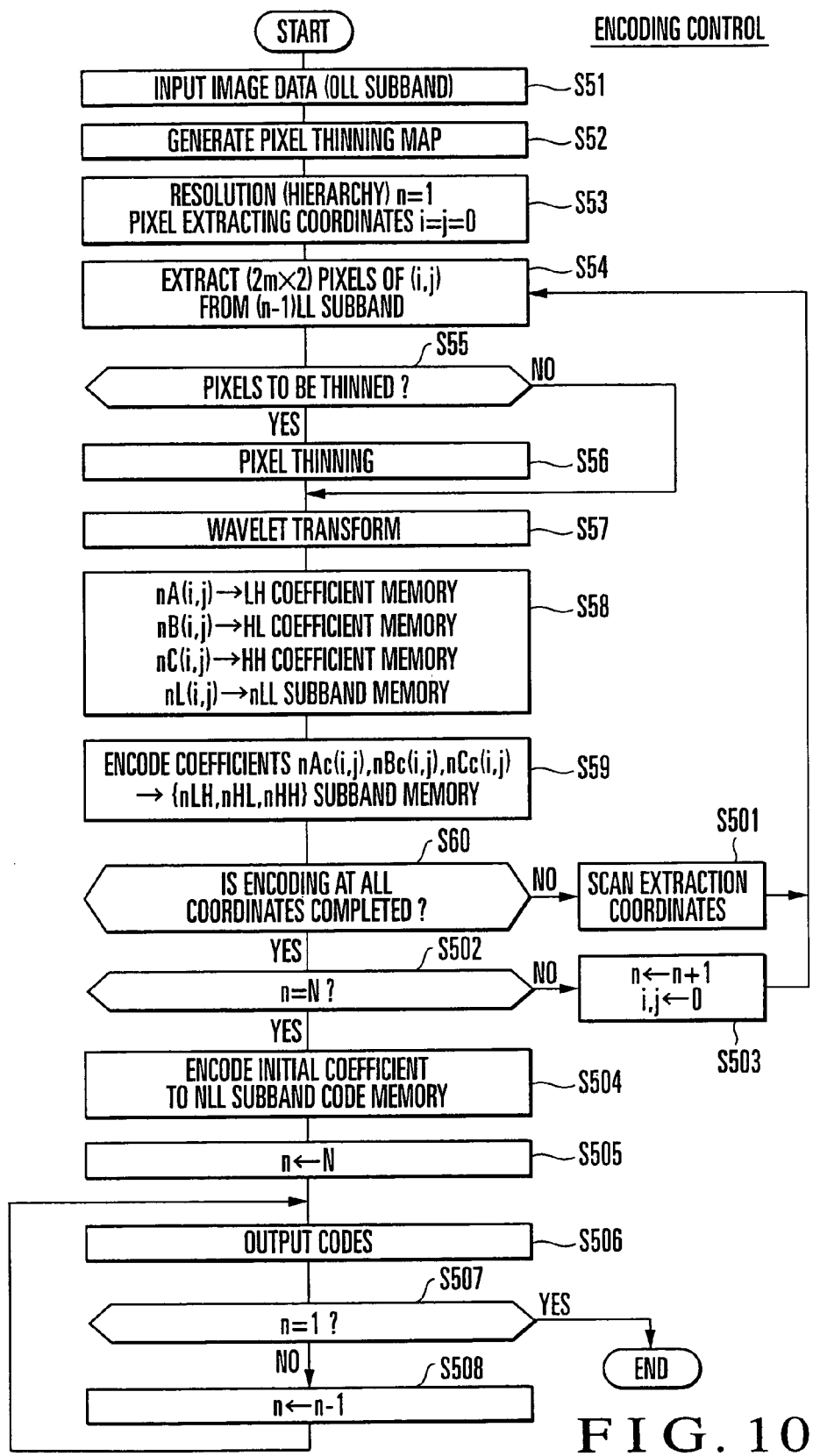
FIG. 10 is a flowchart showing encoding control by the encoding device according to the third embodiment of the present invention.

FIG. 10 is a flowchart showing encoding control in this embodiment.

First, the image data 10 is input from an image input device such as a camera or scanner, and stored as a 0LL subband in the LL subband memory 402 (step S51).

When the image is input, the pixel thinning map generation process on the data processor 401 loads the 0LL subband data, generates a pixel thinning map indicating the resolution level to which pixels at individual coordinates are thinned before encoding, and stores the generated map in the pixel thinning map memory 405 (step S52).

For example, when one image contains both a character binary region and a photograph in which the colors and tones finely change, it is possible to distinguish between the photograph region and character region by detecting the displacement of adjacent element values or by analyzing a feature amount such as the edge strength. The code amount can be reduced while visual quality deterioration is suppressed, by generating a pixel thinning map such that the resolution of the photograph region is lower than that of the character region.

The pixel thinning extraction process sets a variable n indicating the resolution level (hierarchy) to 1, and initializes the spatial coordinates (x,y) of coefficients to be extracted from the subbands nLH, nHL, and nHH to the origin (i=j=0) (step S53).

Subsequently, the pixel thinning extraction process sequentially extracts 2 m×2-pixel partial regions corresponding to the coordinates (i,j) from the (n−1)LL subband in the LL subband memory 402 (step S54). For example, when n=1, m=1, and i=j=0, as shown in FIG. 9, the upper left 2×2 partial region (H1, H2, H3, and H4) is extracted from the 0LL subband (input image data 10).

When the partial region is extracted, the pixel thinning extraction process reads out, from the pixel thinning map memory 405, the resolution level of coordinates corresponding to the extracted partial region, and checks by the value of the resolution level whether the extracted portion is an object of pixel thinning (step S55). If the extracted portion is an object of thinning (YES in step S55), the pixels are thinned by a predetermined thinning operation (step S56), and wavelet transform is executed on the thinned pixel values (step S57). If the extracted portion is not an object of thinning (NO in step S55), wavelet transform is executed while the pixel values in the extracted portion remain unchanged (step S57). Note that the thinning operation is not particularly limited. It is possible to use one pixel value in the extracted region as a representative value, or calculate the mean of all extracted pixel values.

For example, if 2×2 extracted pixels are pixels to be thinned, they are supplied as 2×2 pixels having the mean value of their pixel values to the wavelet operation process. If they are not pixels to be thinned, the pixel values of the 2×2 pixels are directly supplied to the wavelet operation process.

The wavelet transform process executes two-dimensional Haar wavelet transform on the extracted 2 m×2-pixel partial region (step S57), stores an LH coefficient nA(i,j), HL coefficient nB(i,j), and HH coefficient nC(i,j) obtained by the transform into the coefficient memory 403, and stores an LL coefficient nL(i,j) as an nLL subband in the LL subband memory 402 (step S58).

Subsequently, the wavelet transform process calls the coefficient encoding process, and the coefficient encoding process reads out the set of coefficients nA(i,j), nB(i,j), and nC(i,j) from the coefficient memory 403, performs variable-length coding on the readout coefficients, and stores the codes in the subband code memory 404.1 of the output code memory 404 (step S59). When this encoding of the coefficient set read out to the coefficient memory 403 is completed, the pixel thinning extraction process checks whether encoding at all coordinates in the hierarch n is completed (step S60).

If encoding at all coordinates in the hierarchy n is not completed (NO in step S60), the extraction coordinates (i,j) are shifted by a predetermined number in the scan line direction (step S501), and steps S54 to S60 and S501 described above are repeated until encoding at all coordinates in the hierarchy n is completed.

If encoding at all coordinates in the hierarchy n is completed (YES in step S60), whether the present hierarchy n is a hierarchy N having the lowest resolution level is checked (step S502). If n has not reached N (NO in step S502), n is incremented by 1, and the spatial coordinates (x,y) are initialized to the origin (i=j=0) (step S503). Steps S54 to S60 and S501 to S503 described above are repeated while the hierarchy n is thus increased by 1 at a time.

If encoding of the subbands of the lowest resolution level N is completed (YES in step S502), the initial coefficient encoding process starts to encode the NLL subband coefficients stored in the LL subband memory 402, and store the codes in the NLL subband code memory 404.2 of the output code memory 404 (step S504).

Steps S504 to S508 are the same as steps S401 to S405 in FIG. 7, so an explanation thereof will be omitted.

In this embodiment, the resolution level determination method in the pixel thinning map generation process is not limited. For example, in an image containing both a photograph/natural picture region and a character/graph region, the resolution levels of the photograph/natural picture region and character/graph region can be made different from each other in accordance with the intention of an image viewer. Also, the code amount can be reduced while cognitive quality deterioration is suppressed, by decreasing the resolution of a region such as a photograph/natural picture region having a moderate luminance change.

It is also possible to make the resolution of a region where the displacement of adjacent element values is relatively large in an image different from that of a region where the displacement is relatively small. In particular, the resolution of the region where the displacement is relatively small may be set lower than that of the region where the displacement is relatively large. The magnitude of the displacement of adjacent element values can be determined in accordance with whether the displacement of adjacent element values is larger or smaller than a preset threshold value.

3.2) Decoding Device

The codes output by the encoding method of this embodiment can be decoded by the decoding method of the first embodiment shown in FIGS. 4 and 5, so a detailed explanation thereof will be omitted.

3.3) Effects

In the encoding device and encoding control of the third embodiment, it is possible to increase the speed of the encoding process and reduce the necessary memory as in the first embodiment, and it is also possible to encode an image at different resolution levels corresponding to partial regions by the pixel thinning extraction process as described above.

In this case, pixel thinning and extraction are simultaneously performed, so the processing load produced by thinning can be minimized. This makes it possible to encode, at high resolution, only a region of interest of a viewer or a region where characters or details are important, and reduce the code amounts of other regions, thereby reducing the cognitive waiting time. Especially in an image containing both a photograph/natural picture region and character/graph region, the code amount can be reduced by thinning many pixels in the photograph/natural picture region, while minimum necessary information for understanding the meaning of the image, e.g., recognizing an outline of the object or reading the characters is maintained.

Note that steps S52, S55, and S56 as the thinning-related process described above may also be applied to the encoding control flow of the first embodiment shown in FIG. 3.

More specifically, pixel thinning map generation step S52 is inserted after image data input step S11 in FIG. 3. In addition, in identical coordinate coefficient extraction step S15, the identical coordinate coefficient extraction process refers to the pixel thinning map, and immediately extracts coefficients if no thinning is necessary, or extracts coefficients after thinning them to the resolution set for the coordinates if thinning is necessary.

3.4) Practical Example

Figure 11:
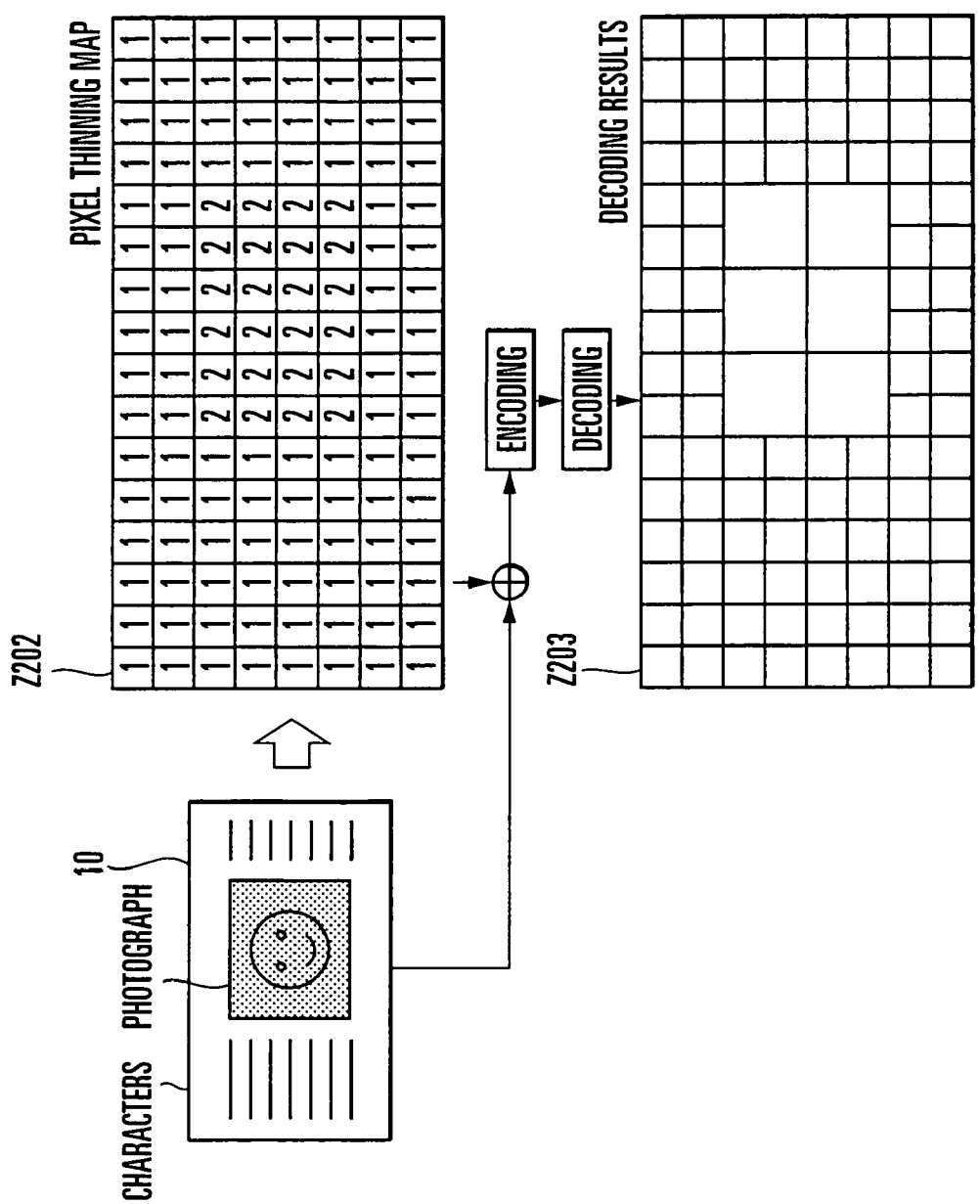
FIG. 11 is a view schematically showing encoding and decoding operations according to the third embodiment of the present invention.

FIG. 11 is a view schematically showing the encoding and decoding operations according to the third embodiment of the present invention. Assume that this practical example uses a video camera as the image input device, a personal computer as the data processor 401, semiconductor memories (included in the personal computer) as the data storage devices 402 to 405, and a wired or wireless network communication controller as the code output device 406. The basic configuration of this practical example is the same as the second practical example except that the personal computer as the data processor 401 has the functions of pixel thinning map generation and pixel thinning extraction.

Referring to FIG. 11, when the input image 10 is given from the video camera, the image input process stores the image data in the semiconductor memory. The pixel thinning map generation process analyzes a feature amount such as the edge strength of the input image, separates a photograph region and character region, and generates a pixel thinning map Z202 in which the photograph region is set at resolution level 2 and the character region is set at resolution level 1.

The pixel thinning extraction process extracts pixel regions each having 2×2 pixels by using the input image 10 and pixel thinning map Z202, and performs the wavelet operation and encoding by thinning the pixels if the pixel region is a photograph region, or immediately performs the wavelet operation and encoding if the pixel region is a character region.

The output code sequence is decoded by the decoding device to obtain a decoded image Z203 in which only the resolution of the photograph region is decreased.

4. Fourth Embodiment

4.1) Encoding Device

Figure 12:
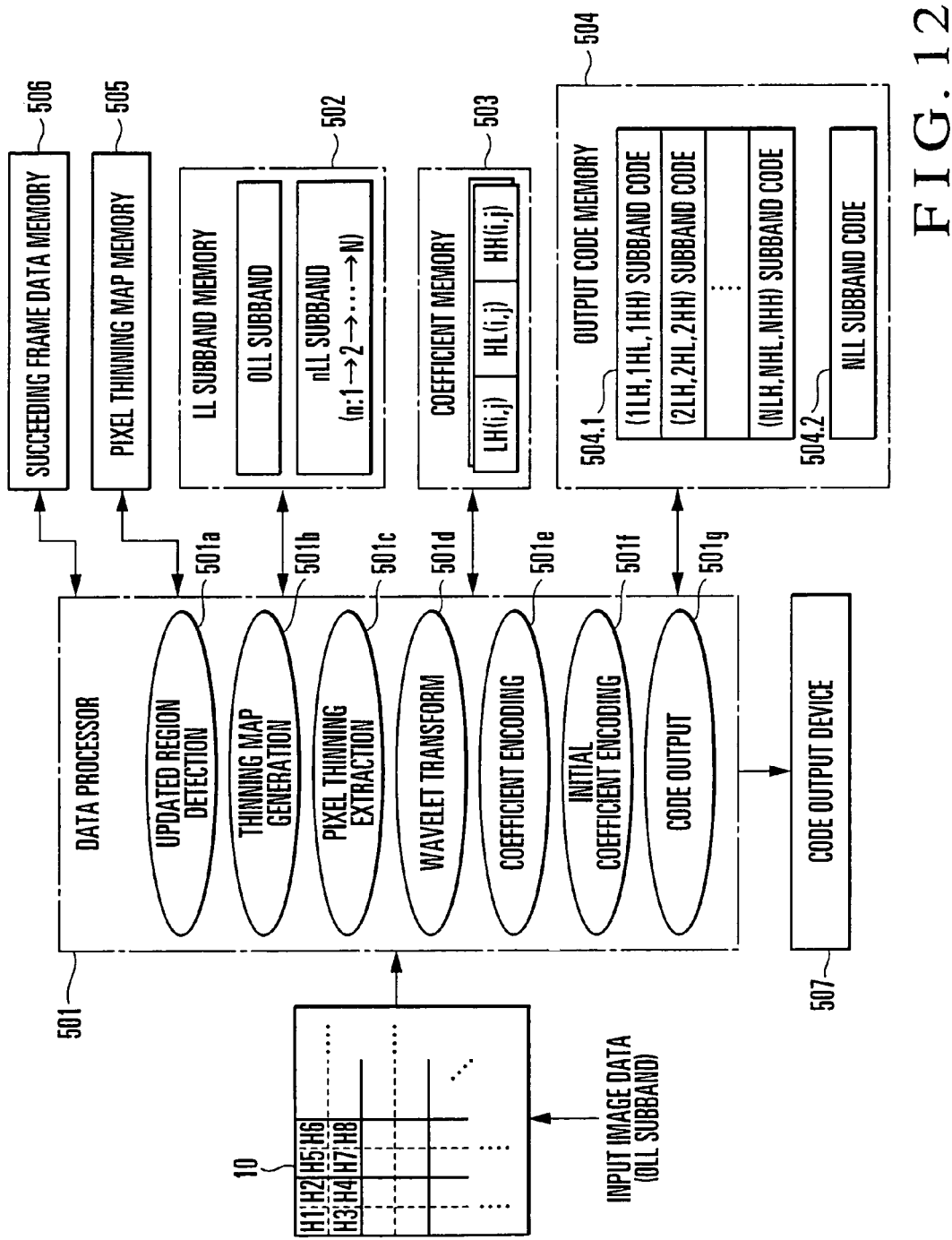
FIG. 12 is a block diagram showing an outline of the arrangement of an encoding device according to the fourth embodiment of the present invention.

FIG. 12 is a block diagram showing an outline of the arrangement of an encoding device according to the fourth embodiment of the present invention. This encoding device receives image data 10 as a representative example of two-dimensional signals from an image input device (not shown) such as a video camera, and outputs a code sequence by wavelet encoding (to be described later). The encoding device mainly comprises a data processor 501, LL subband memory 502, coefficient memory 503, output code memory 504, pixel thinning map memory 505, and succeeding frame data memory 506, and outputs the generated code sequence to a code output device 507.

The data processor 501 is a program control processor such as a general CPU, and can generate a updated region detection process (updated region detecting means 501a), a pixel thinning map generation process (pixel thinning map generating means 501b), a pixel thinning extraction process (pixel thinning extracting means 501c), a wavelet transform (in this embodiment, two-dimensional Haar wavelet transform) process (wavelet transforming means 501d), a coefficient encoding process (coefficient encoding means 501e), initial coefficient encoding process (initial coefficient encoding means 501f), and a code output process (code output means 501g) by reading out encoding programs from a program memory (not shown) and executing the readout programs (details will be described later).

The LL subband memory 502, coefficient memory 503, output code memory 504, pixel thinning map memory 505, and succeeding frame data memory 506 may be formed by discrete memories, and may also be formed by allocating the individual spaces in one semiconductor memory. Note that in the present invention, a register or cache memory of the CPU can be used as the coefficient memory 503 as will be described later.

The LL subband memory 502 stores the input image data 10 as 0LL subband data, and also sequentially stores nLL subband coefficients ($1 \leq n \leq N$) obtained by performing two-dimensional Haar wavelet transform on partial regions (2 m×2) sequentially extracted by the pixel extraction process, thereby finally storing NLL subband coefficients. In the encoding device according to the fourth embodiment, the pixel thinning extraction process sequentially extracts 2 m×2-pixel partial regions from (n−1)LL subband coefficients, thins the extracted partial regions, and executes two-dimensional Haar wavelet transform on the results, thereby obtaining nLL subband coefficients. The partial regions (2 m×2) are sequentially extracted in the scan line direction.

The coefficient memory 503 stores a set of coefficients {LH(i,j),HL(i,j),HH(i,j)} at identical spatial coordinates (i,j) in subbands nLH, nHL, and nHH of one hierarchy obtained by two-dimensional Haar wavelet transform. Note that a predetermined number of two or more coefficient sets can also be stored. For example, one or more coefficient sets adjacent to {LH(i,j),HL(i,j),HH(i,j)} may also be extracted and stored in the coefficient memory 503. As described above, when a cache memory of the CPU is used as the coefficient memory 503, a plurality of sets of coefficients can be stored if the cache memory has a free space.

The output code memory 504 has an (nLH,nHL,nHH) subband code memory 504.1 and an NLL subband code memory 504.2 for an initial output code. The (nLH,nHL, nHH) subband code memory 504.1 stores a code (nLH,nHL, nHH)c obtained by encoding, by the coefficient encoding process, a set of identical coordinate coefficients sequentially read out to the coefficient memory 503. The NLL subband code memory 504.2 stores a subband code NLLc obtained by encoding an NLL subband coefficient by the initial coefficient encoding process of the data processor 501.

The pixel thinning map memory 505 is generated by the pixel thinning map generation process (to be described later), and stores the resolution level of each portion of an image. By searching the pixel thinning map memory 505, therefore, whether to perform a pixel thinning process on an extracted partial region can be determined (details will be explained later).

When a plurality of frames of the image data 10 are successively input, the succeeding frame data memory 506 stores input frame data following the present frame stored in the LL subband memory 502.

The updated region detection process on the data processor 501 detects a pixel value changing region (updated region, changed region) in the succeeding frame, from the present input image and the contents of the succeeding frame data memory 506.

On the basis of information of the detected updated region, the pixel thinning map generation process generates a coefficient thinning map in which the resolution of the updated region differs from that of the other region. More specifically, the updated region is set at low resolution, and the other region is set at high resolution.

(Encoding Control)

Figure 13:
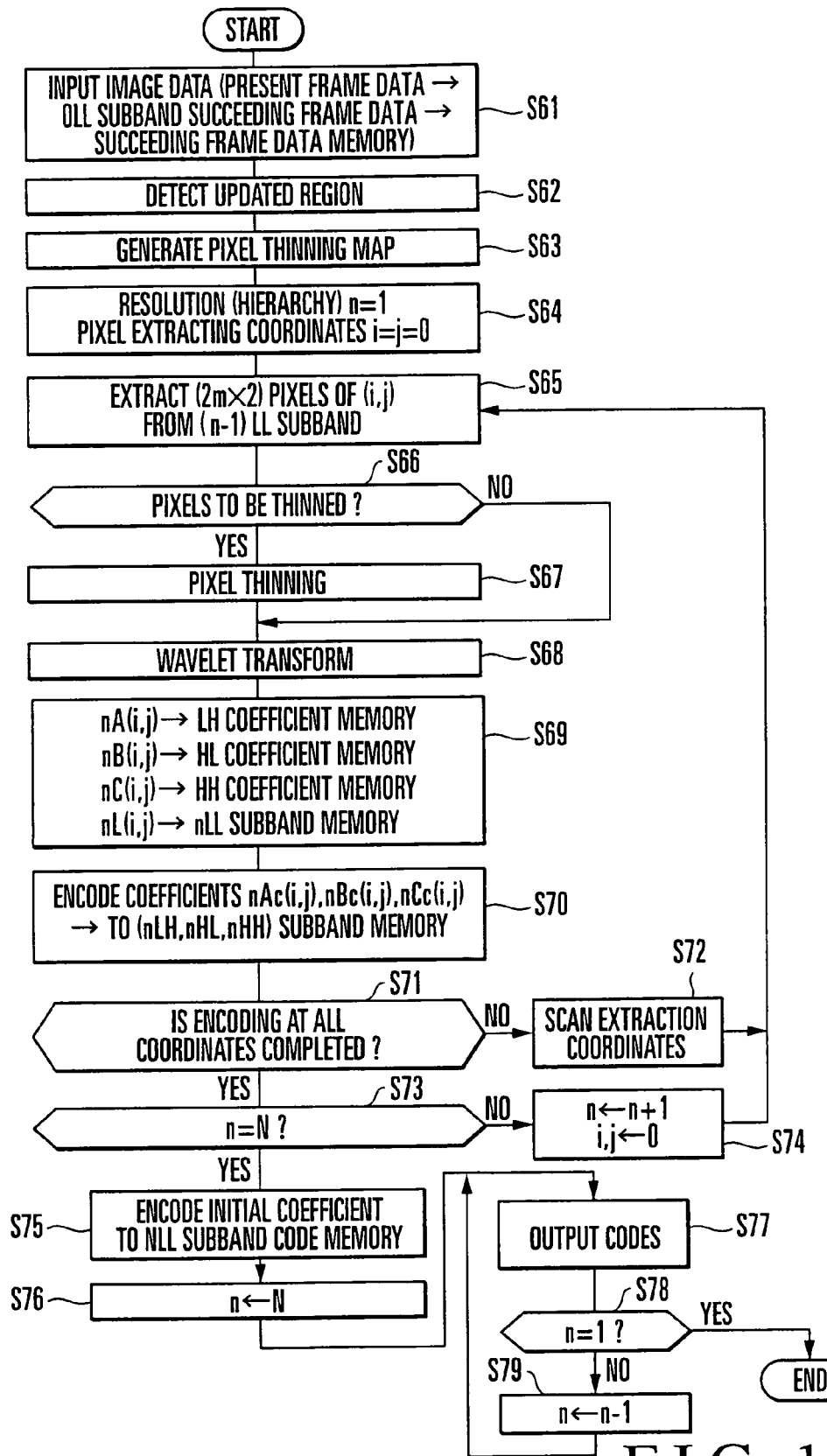
FIG. 13 is a flowchart showing encoding control by the encoding device according to the fourth embodiment of the present invention.

FIG. 13 is a flowchart showing encoding control in this embodiment.

First, when the moving image data 10 is input from a moving image input device such as a video camera, frame data to be encoded is stored as a 0LL subband in the LL subband memory 502, and succeeding frame data is stored in the succeeding frame data memory 506 (step S61).

The updated region detection process detects a updated region on the basis of the 0LL subband data stored in the LL subband memory 502 and succeeding frame data stored in the succeeding frame data memory (step S62). An example of the updated region detection method is a method of calculating the difference between two frame images.

The pixel thinning map generation process generates a pixel thinning map in which the detected updated region is set at low resolution and the other region is set at high resolution, and stores the generated map in the pixel thinning map memory 505 (step S63).

Subsequently, the pixel thinning extraction process sets a variable n indicating the resolution level (hierarchy) to 1, and initializes the spatial coordinates (x,y) of coefficients to be extracted from the subbands nLH, nHL, and nHH to the origin (i=j=0) (step S64).

The pixel thinning extraction process then sequentially extracts 2 m×2-pixel partial regions corresponding to the coordinates (i,j) from the (n−1)LL subband in the LL subband memory 502 (step S54). For example, when n=1, m=1, and i=j=0, as shown in FIG. 12, the upper left 2×2 partial region (H1, H2, H3, and H4) is extracted from the 0LL subband (input image data 10).

When the partial region is extracted, the pixel thinning extraction process reads out, from the pixel thinning map memory 505, the resolution level of coordinates corresponding to the extracted partial region, and checks by the value of the resolution level whether the extracted portion is an object of pixel thinning (step S66). If the extracted portion is an object of thinning (YES in step S66), the pixels are thinned by a predetermined thinning operation (step S67), and wavelet transform is executed on the thinned pixel values (step S68). If the extracted portion is not an object of thinning (NO in step S66), wavelet transform is executed while the pixel values of the extracted portion remain unchanged (step S68). Note that the thinning operation is not particularly limited. It is possible to use one pixel value in the extracted region as a representative value, or calculate the mean of all extracted pixel values.

For example, if 2×2 extracted pixels are pixels to be thinned, they are supplied to the wavelet operation process as 2×2 pixels having the mean value of the pixel values. If they are not pixels to be thinned, the pixel values of the 2×2 pixels are directly supplied to the wavelet operation process.

The wavelet transform process executes two-dimensional Haar wavelet transform on the extracted 2 m×2-pixel partial region (step S68), stores an LH coefficient nA(i,j), HL coefficient nB(i,j), and HH coefficient nC(i,j) obtained by the transform into the coefficient memory 503, and stores an LL coefficient nL(ij) as an nLL subband in the LL subband memory 502 (step S69).

Subsequently, the wavelet transform process calls the coefficient encoding process, and the coefficient encoding process reads out the set of coefficients nA(i,j), nB(i,j), and nC(i,j) from the coefficient memory 503, performs variable-length coding on the readout coefficients, and stores the codes in the subband code memory 504.1 of the output code memory 504 (step S70). When this encoding of one or a predetermined number of two or more coefficient sets read out to the coefficient memory 503 is completed, the pixel thinning extraction process checks whether encoding at all coordinates in the hierarch n is completed (step S71).

If encoding at all coordinates in the hierarchy n is not completed (NO in step S71), the extraction coordinates (i,j) are shifted by a predetermined number in the scan line direction (step S72), and steps S65 to S72 described above are repeated until encoding at all coordinates in the hierarchy n is completed.

If encoding at all coordinates in the hierarchy n is completed (YES in step S71), whether the present hierarchy n is a hierarchy N having the lowest resolution level is checked (step S73). If n has not reached N (NO in step S73), n is incremented by 1, and the spatial coordinates (x,y) are initialized to the origin (i=j=0) (step S74). Steps S65 to S74 described above are repeated while the hierarchy n is thus increased by 1 at a time.

If encoding of the subbands of the lowest resolution level N is completed (YES in step S73), the initial coefficient encoding process starts to encode the NLL subband coefficients stored in the LL subband memory 502, and store the codes in the NLL subband code memory 504.2 of the output code memory 504 (step S75).

Steps S75 to S79 are the same as steps S401 to S405 in FIG. 7, so an explanation thereof will be omitted.

Note that succeeding frame information used in this embodiment may be image data of the succeeding frame or coordinate information of an updating region where the signal value is to be updated. When image data is used as the succeeding frame information, a updated region can be detected by calculating the difference between the present frame image and succeeding frame image. When the coordinate information of an updating region is used, this updating region can be directly used as a updated region.

It is also possible to use a plurality of frames, instead of a single frame, as the succeeding frame information. When a plurality of frames are used, a period during which the values of pixels change in each partial region is obtained, and the resolution of the pixel thinning map is set on the basis of this changing period. More specifically, the resolution of a region having a long pixel changing period, i.e., a region where pixels change for a long time period is lowered. The code amount can be further reduced by thus generating the pixel thinning map.

Steps S61 to S63, S66, and S67 as the processes related to updated region detection and thinning in the fourth embodiment described above can also be applied to the encoding control flow of the first embodiment shown in FIG. 3.

4.2) Decoding Device

The codes output by the encoding method of this embodiment can be decoded by the decoding method of the first embodiment shown in FIGS. 4 and 5, so a detailed explanation thereof will be omitted.

4.3) Effects

In the encoding device and encoding control of the fourth embodiment, it is possible to increase the speed of the encoding process and reduce the necessary memory as in the first embodiment, and it is also possible, when successive frames are to be encoded, to detect a region which is overwritten by the succeeding frame image as a updated region, and generate a pixel thinning map in which the updated region is set at low resolution and the other region is set at high resolution, thereby reducing the code amount of the updated region and increasing the frame rate. Although the resolution of the updated region decreases as a tradeoff with the reduction in code amount, the updated region is a region to be overwritten with the succeeding frame, so the viewer does not easily cognize the visual quality deterioration even when the image is temporarily displayed at low resolution.

4.4) Practical Example

Figure 14:
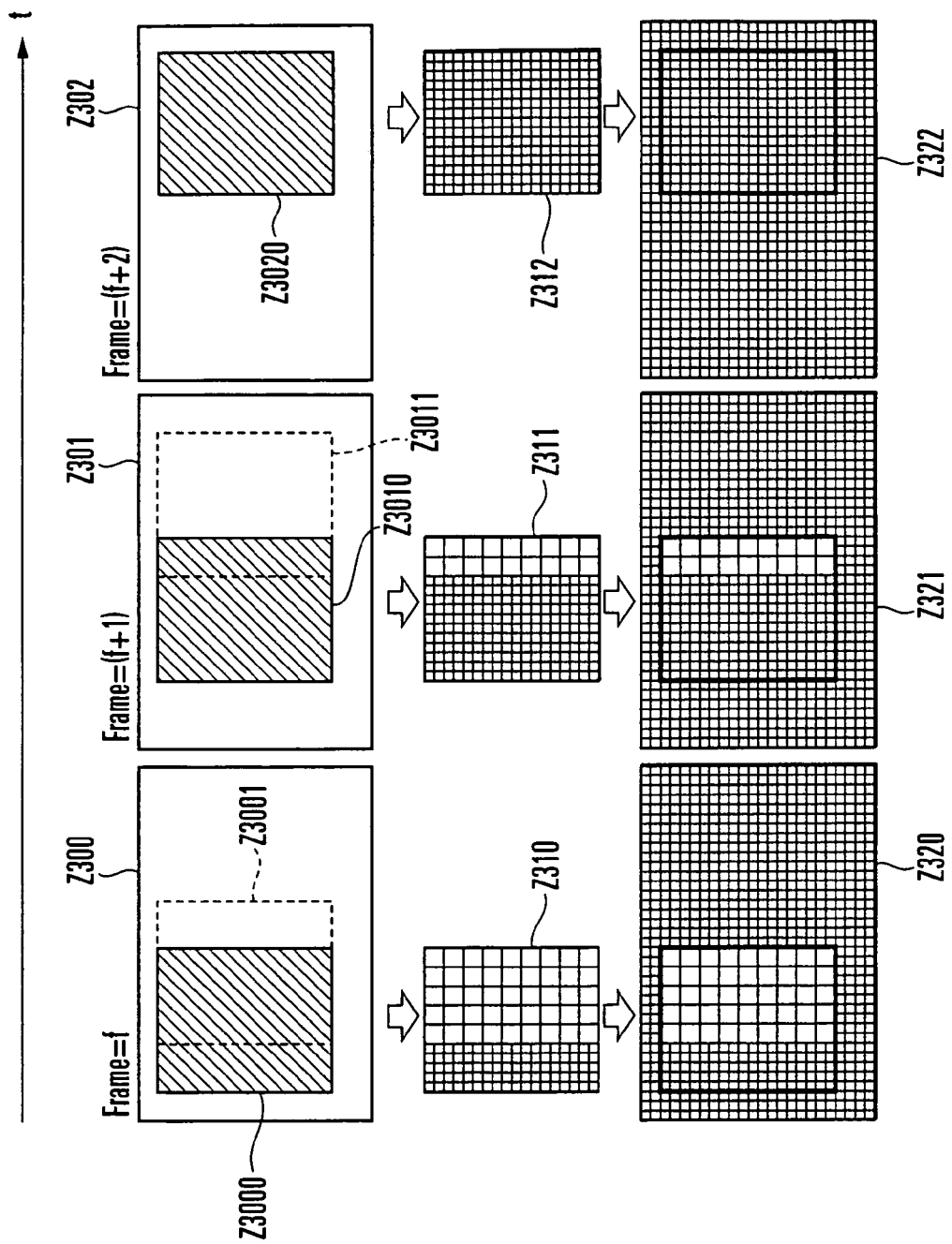
FIG. 14 is a view schematically showing a console screen for explaining updated region detection and a thinning operation in the fourth embodiment of the present invention.

FIG. 14 is a view schematically showing a console screen for explaining the operations of updated region detection and thinning according to the fourth embodiment of the present invention. This practical example uses a video camera as the image input device, a CPU of a workstation as the data processor 501, semiconductor storage devices (included in the workstation) as the data storage devices 502 to 506, and a communication controller connected to a network as the code output device. As described above, the CPU of the workstation can implement the functions of updated region detection, pixel thinning map generation, pixel thinning extraction, wavelet transform, coefficient encoding, initial coefficient encoding, and code output.

Assume that the console screen of the workstation is used as a display means for schematically displaying the processes of detecting a updated region in an image and thinning the updated region. FIG. 14 schematically shows the way updating regions of a frame image are sequentially supplied, encoded, and transmitted.

Z300 denotes the state of the console screen in a frame f, and Z3000 denotes an updating region on the screen Z300 in the frame f. Z301 denotes the state of the console screen in a frame (f+1), and Z3010 denotes an updating region on the screen Z301 in the frame (f+1). Z302 denotes the state of the console screen in a frame (f+2), and Z3020 denotes an updating region on the screen.

As described previously, the workstation acquires the coordinates of an updating region in the succeeding frame (f+1) in advance when the frame f is displayed. That is, Z3001 denotes the position of the updating region in the succeeding frame (f+1) on the screen Z300 of the frame f, and Z3011 similarly denotes the coordinates of the updating region in the succeeding frame (f+2) on the screen Z301 of the frame (f+1). Also, the screen Z302 is not updated in the frame following the frame (f+2).

The operation in the frame f is as follows. First, the workstation acquires the input image Z3000 and succeeding frame information Z3001. The updated region detection process detects an overlapping region of Z3000 and Z3001 as a updated region, and the pixel thinning map generation process generates a pixel thinning map Z310 in which the updated region is set at resolution level 2 and the other region is set at resolution level 1.

On the basis of the input image Z3000 and pixel thinning map Z310, the pixel thinning extraction process extracts pixels by 2×2 pixels at a time and supplies them to the wavelet operation process, and the wavelet operation process performs wavelet transform and encoding. The updated region at resolution level 2 is encoded after pixels are thinned. The thus obtained codes are decoded and drawn in the updating region, thereby obtaining a display image Z320 having resolution decreased by the updated region. The foregoing is the operation in the frame f.

Similarly, in the frame (f+1), an overlapping region of the input image Z3010 and succeeding frame information Z3011 is detected as a updated region, and a pixel thinning map Z311 is generated. As a consequence, a display image Z321 which is roughened by the resolution of the updated region is obtained.

In the frame (f+2), no updated region is detected because no updating region exists in the succeeding frame. Therefore, no pixel thinning is performed (Z312). As a consequence, a decoded image Z322 having high resolution over the entire region on the screen is obtained.

5. Fifth Embodiment

5.1) Encoding Device

Figure 15:
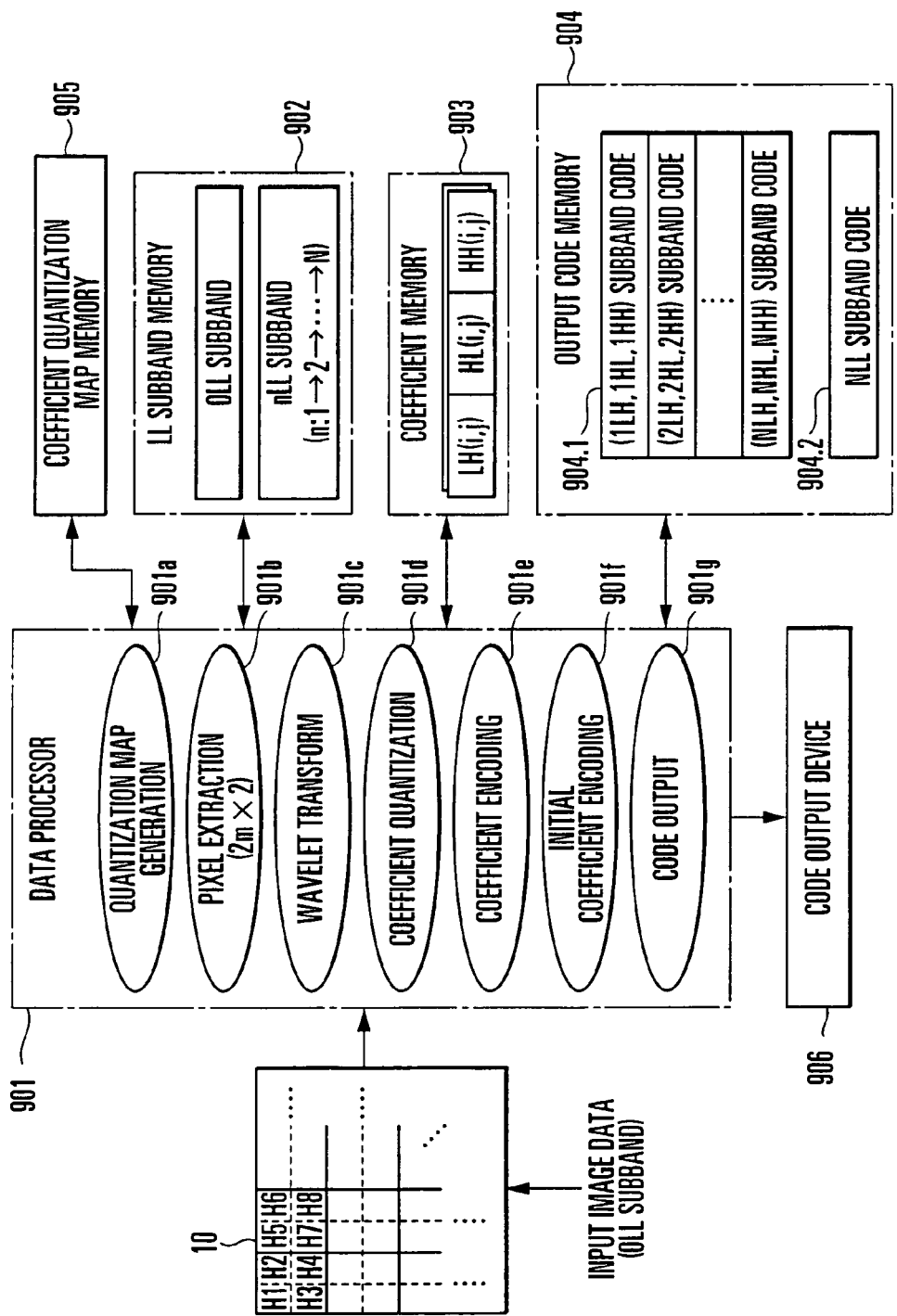
FIG. 15 is a block diagram showing an outline of the arrangement of an encoding device according to the fifth embodiment of the present invention.

FIG. 15 is a block diagram showing an outline of the arrangement of an encoding device according to the third embodiment of the present invention. The basic arrangement of this embodiment is the same as the second embodiment except that a data process 901 can generate a coefficient quantization map generation process and coefficient quantization process, and has a coefficient quantization map memory 905.

That is, the data processor 901 can generate a coefficient quantization map generation process (coefficient quantization map generating means 901*a*), a pixel extraction process (pixel extracting means 901*b*), a wavelet transform (in this embodiment, two-dimensional Haar wavelet transform) process (wavelet transforming means 901*c*), a coefficient quantization process (coefficient quantizing means 901*d*), a coefficient encoding process (coefficient encoding means 901*e*), an initial coefficient encoding process (initial coefficient encoding means 9010, and a code output process (code output means 901*g*).

The coefficient quantization map memory 905 stores a coefficient quantization map containing quantization parameters in individual portions of an image. By searching the coefficient quantization map memory 905, therefore, it is possible to obtain the accuracy of coefficient quantization to a partial region extracted by the pixel extraction process (details will be described later). Note that the coefficient quantization map is generated by the coefficient quantization map generation process.

Figure 16:
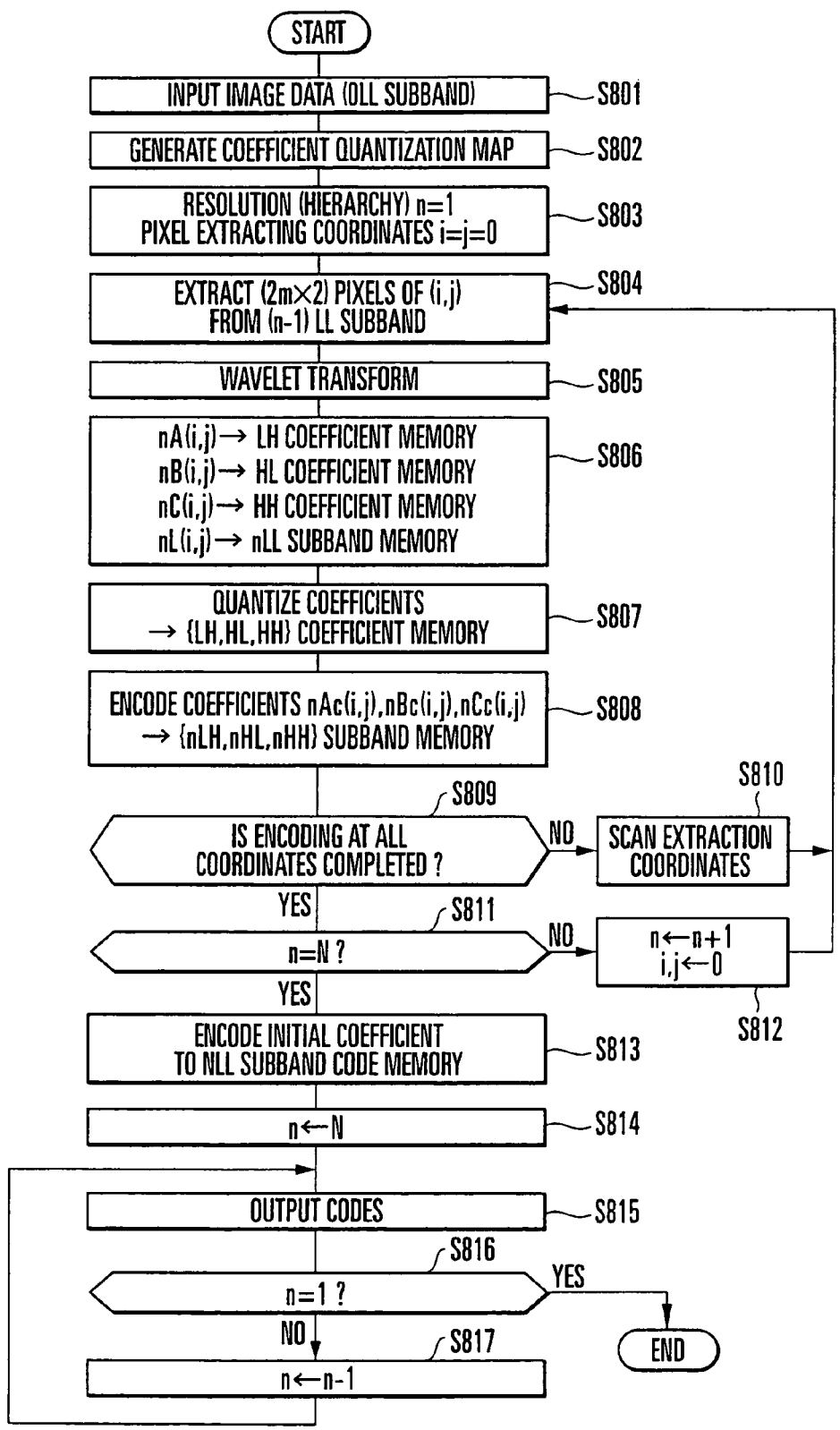
FIG. 16 is a flowchart showing encoding control according to the fifth embodiment of the present invention.

FIG. 16 is a flowchart showing encoding control in this embodiment.

First, image data 10 is input from an image input device such as a camera or scanner, and stored as a 0LL subband in the LL subband memory 902 (step S801).

When the image is input, the coefficient quantization map generation process on the data processor 901 loads the 0LL subband data, generates a coefficient quantization map indicating the quantization accuracy to which a coefficient corresponding to each spatial coordinate position/each resolution level is thinned before encoding, and stores the generated map in the coefficient quantization map memory 905 (step S802).

The pixel extraction process sets a variable n indicating the resolution level (hierarchy) to 1, and initializes the spatial coordinates (x,y) of coefficients extracted from subbands nLH, nHL, and nHH to the origin (i=j=j) (step S803).

Subsequently, the pixel extraction process sequentially extracts 2 m×2-pixel partial regions corresponding to the coordinates (i,j) from the (n−1)LL subband in the LL subband memory 902 (step S804). For example, when n=1, m=1, and i=j=0, as shown in FIG. 15, the upper left 2×2 partial region (H1, H2, H3, and H4) is extracted from the 0LL subband (input image data 10) (step S804).

The wavelet transform process executes two-dimensional Haar wavelet transform on the extracted 2 m×2-pixel partial region (step S805), stores an LH coefficient nA(i,j), HL coefficient nB(i,j), and HH coefficient nC(i,j) obtained by the transform into a coefficient memory 903, and stores an LL coefficient nL(i,j) as an nLL subband in the LL subband memory 902 (step S806).

The coefficient quantization process reads out the LH coefficient nA(i,j), HL coefficient nB(i,j), and HH coefficient nC(i,j) from the coefficient memory 903. In addition, the coefficient quantization process reads out a coefficient quantization parameter corresponding to the spatial coordinate/resolution level of interest from the coefficient quantization map memory 905, and quantizes the LH coefficient nA(i,j), HL coefficient nB(i,j), and HH coefficient nC(i,j) to the quantization accuracy indicated by the parameter. The contents of the coefficient memory 903 are updated by these quantized coefficients (step S807).

Steps S808 to S817 are the same as steps S46 to S50 and S401 to S405 in FIG. 7, so an explanation thereof will be omitted. Note that in FIG. 15, reference numeral 904 denotes an output code memory; 904.1, an (nLH,nHL,nHH) subband code memory; 904.2, an NLL subband code memory; and 906, a code output device.

As in the third embodiment, the coefficient quantization map may also be generated such that the coefficient quantization accuracy of a photograph region differs from that of a character region. For example, when one image contains both a character binary region and a photograph in which the colors and tones finely change, it is possible to distinguish between the photograph region and character region by detecting the displacement of adjacent element values or by analyzing a feature amount such as the edge strength. The code amount can be suppressed, by generating a coefficient quantization map such that the quantization accuracy of the photograph region is lower than that of the character region.

It is also possible to make the coefficient quantization accuracy of a region where the displacement of adjacent element values is relatively large in an image different from that of a region where the displacement is relatively small. In particular, the quantization accuracy of the region where the displacement is relatively small may be set lower than that of the region where the displacement is relatively large. The magnitude of the displacement of adjacent element values can be determined in accordance with whether the displacement of adjacent element values is larger or smaller than a preset threshold value.

5.2) Decoding Device

The codes output by the encoding method of this embodiment can be decoded by the decoding method of the first embodiment shown in FIGS. 4 and 5, so a detailed explanation thereof will be omitted.

5.3) Effects

In the encoding device and encoding control of the fifth embodiment, it is possible to increase the speed of the encoding process and reduce the necessary memory as in the first embodiment, and it is also possible to encode an image at different quantization accuracies corresponding to individual partial regions by the coefficient quantization process as described above. As in the third embodiment, this makes it possible to encode, at high resolution, only a region of interest of a viewer or a region where characters or details are important, and reduce the code amounts of other regions, thereby reducing the cognitive waiting time.

Additionally, the fifth embodiment can perform quality control in finer units than in the third embodiment. In the third embodiment, the quality of a region of no interest is decreased by lowering the resolution in units of the power of 2, e.g., ½ or ¼. Therefore, the resolution must be halved even when the quality is to be decreased only slightly. In the fifth embodiment, however, quantization distortion such as mosquito noise can be finely controlled by controlling the quantization accuracy.

5.4) Practical Example

Figure 17:
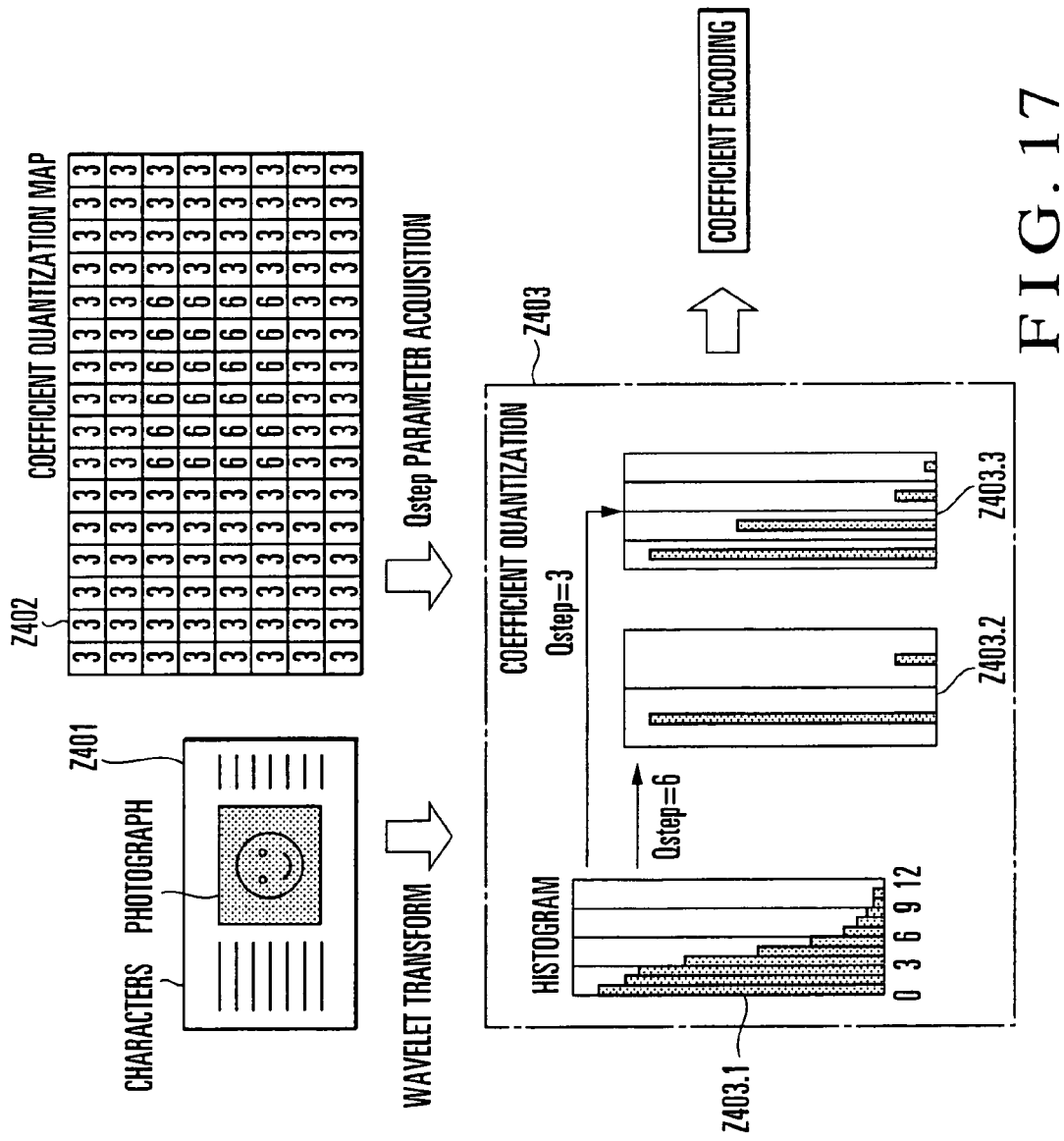
FIG. 17 is a view schematically showing encoding and decoding operations according to the fifth embodiment of the present invention.

FIG. 17 is a view schematically showing the encoding operation according to the fifth embodiment of the present invention. Assume that this practical example uses a video camera as the image input device, a personal computer as the data processor 901, semiconductor memories (included in the personal computer) as the data storage devices 902 to 905, and a wired or wireless network communication controller as the code output device 906. The basic configuration of this practical example is the same as the second practical example except that the personal computer as the data processor 901 has the functions of coefficient quantization map generation and coefficient quantization.

Referring to FIG. 17, when an input image Z401 is input from the video camera, the image input process stores the image data in the semiconductor memory. The coefficient quantization map generation process analyzes a feature amount such as the edge strength of the input image, separates a photograph region and character region, and generates a coefficient quantization map Z402 in which the photograph region is set at quantization step 6 (Qstep=6) and the character region is set at quantization step 3 (Qstep=3).

The pixel extraction process and wavelet transform process extract 2×2-pixel regions by using the input image Z401, and perform the wavelet operation. On the basis of information of the quantization step obtained from the coefficient quantization map Z402, the coefficient quantization process quantizes a coefficient value Z403.1 by six steps if the pixel region is a photograph region, thereby obtaining a coefficient value Z403.2. The coefficient quantization process quantizes the pixels by three steps if the pixel region is a character region, thereby obtaining a coefficient value Z403.3. The quantized coefficient is encoded by the coefficient encoding process.

The thus output code sequence is decoded by the decoding device to obtain an image in which only the coefficients of the photograph region are coarsely quantized.

6. Sixth Embodiment

6.1) Encoding Device

Figure 18:
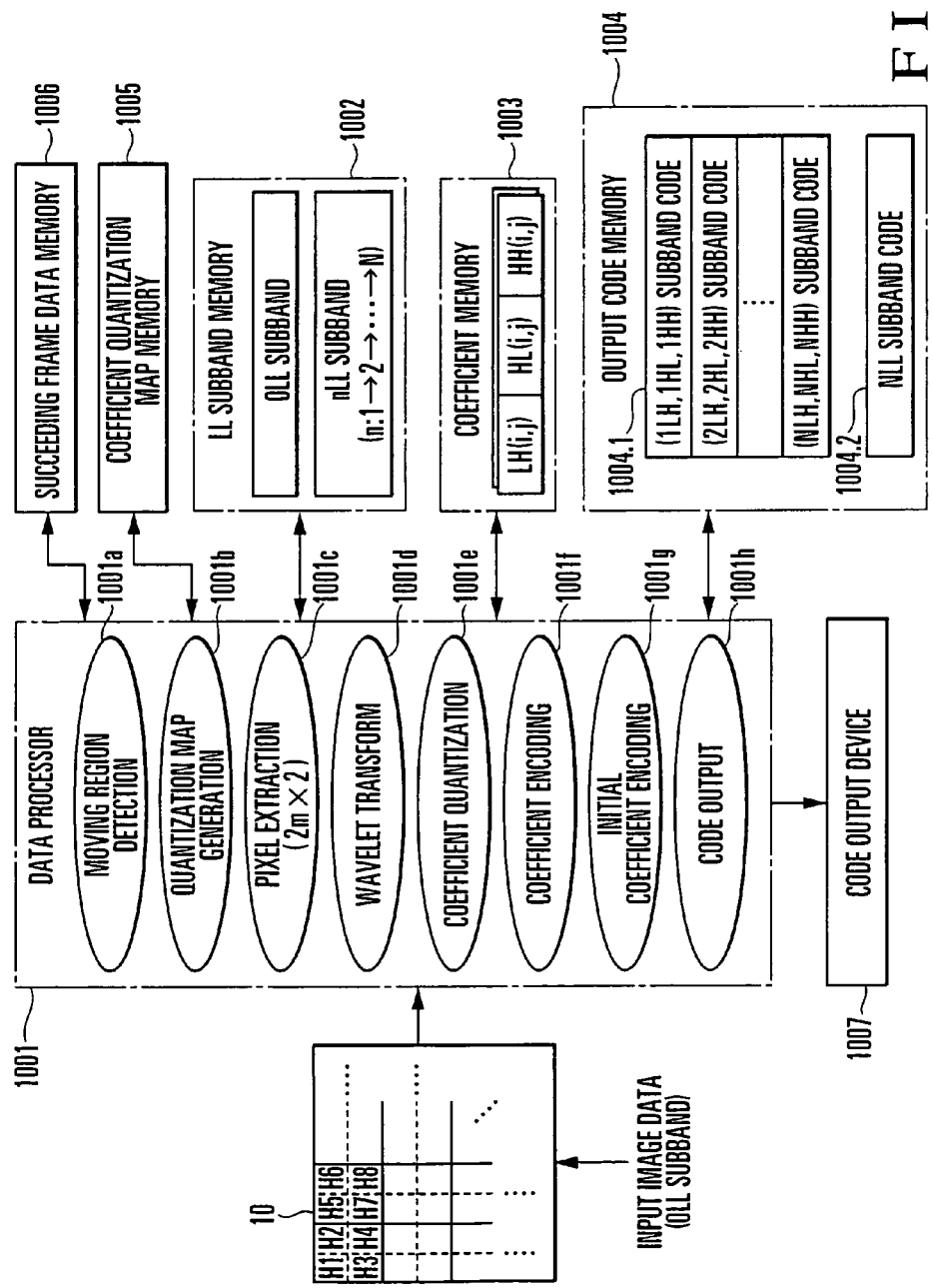
FIG. 18 is a block diagram showing an outline of the arrangement of an encoding device according to the sixth embodiment of the present invention.

FIG. 18 is a block diagram showing an outline of the arrangement of an encoding device according to the sixth embodiment of the present invention. The basic arrangement of this embodiment is the same as the fifth embodiment except that a data processor 1001 can generate a updated region detection process, and has a succeeding frame data memory 1006.

That is, the data processor 1001 can generate a updated region detection process (updated region detecting means 1001$a$), a coefficient quantization map generation process (coefficient quantization map generating means 1001$b$), a pixel extraction process (pixel extracting (element extracting) means 1001$c$), a wavelet transform (in this embodiment, two-dimensional Haar wavelet transform) process (wavelet transforming means 1001$d$), a coefficient quantization process (coefficient quantizing means 1001$e$), a coefficient encoding process (coefficient encoding means 10010, an initial coefficient encoding process (initial coefficient encoding means 1001$g$), and a code output process (code output means 1001$h$).

As in the fourth embodiment, the updated region detection process on the data processor 1001 detects a pixel value changing region (updated region, changed region) in the succeeding frame, from the present input image and the contents of the succeeding frame data memory 1006.

On the basis of information of the detected updated region, the coefficient quantization map generation process generates a coefficient quantization map in which the quantization accuracy of the updated region differs from that of the other region. More specifically, the updated region is set at low quantization accuracy, and the other region is set at high quantization accuracy.

Figure 19:
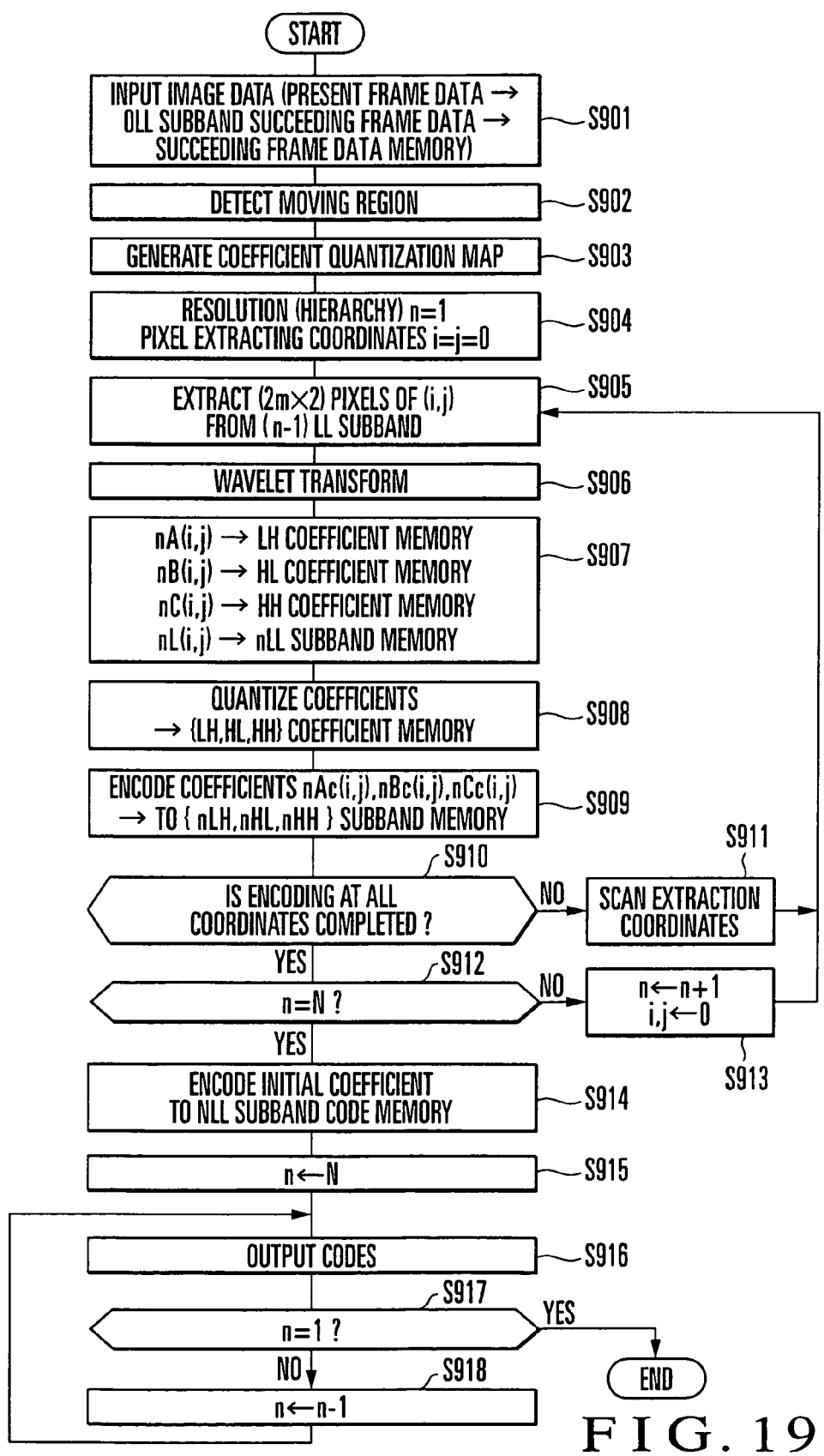
FIG. 19 is a flowchart showing encoding control according to the sixth embodiment of the present invention.

FIG. 19 is a flowchart showing encoding control in this embodiment.

First, when moving image data 10 is input from a moving image input device such as a video camera, frame data to be encoded is stored as a 0LL subband in an LL subband memory 1002, and the succeeding frame data is stored in the succeeding frame data memory 1006 (step S901).

The updated region detection process detects a updated region on the basis of the 0LL subband data stored in the LL subband memory 1002 and the succeeding frame data stored in the succeeding frame data memory 1006 (step S902). An example of the updated region detection method is a method of calculating the difference between two frame images.

The coefficient quantization map generation process generates a coefficient quantization map in which the detected updated region is set at low quantization accuracy and the other region is set at high quantization accuracy, and stores the generated map in the coefficient quantization map memory 1005 (step S903).

Steps 904 to S918 are the same as steps S803 to S817 in FIG. 16, so an explanation thereof will be omitted. Note that in FIG. 18, reference numeral 1003 denotes a coefficient memory; 1004, an output code memory; 1004.1, an (nLH, nHL,nHH) subband code memory; 1004.2, an NLL subband code memory; and 1007, a code output device.

Note that the succeeding frame information used in this embodiment may be image data of the succeeding frame or coordinate information of an updating region where the signal value is to be updated. When image data is used as the succeeding frame information, a updated region can be detected by calculating the difference between the present frame image and succeeding frame image. When the coordinate information of an updating region is used, this updating region can be directly used as a updated region.

It is also possible to use a plurality of frames, instead of a single frame, as the succeeding frame information. When a plurality of frames are used, a period during which the values of pixels change in each partial region is obtained, and the quantization accuracy of the coefficient quantization map is set on the basis of this changing period. More specifically, the quantization accuracy of a region having a long pixel changing period, i.e., a region where pixels change for a long time period is lowered. The code amount can be further reduced by thus generating the coefficient quantization map.

6.2) Decoding Device

The codes output by the encoding method of this embodiment can be decoded by the decoding method of the first embodiment shown in FIGS. 4 and 5, so a detailed explanation thereof will be omitted.

6.3) Effects

In the encoding device and encoding control of the sixth embodiment, it is possible to increase the speed of the encoding process and reduce the necessary memory as in the first embodiment, and it is also possible to reduce the code amount of a updated region and increase the frame rate as in the fourth embodiment.

Additionally, the sixth embodiment can perform quality control in finer units than in the fourth embodiment. In the fourth embodiment, the quality of a updated region is decreased by lowering the resolution in units of the power of 2, e.g., ½ or ¼. Therefore, the resolution must be halved even when the quality is to be decreased only slightly. In the sixth embodiment, however, quantization distortion such as mosquito noise can be finely controlled by controlling the quantization accuracy.

6.4) Practical Example

The basic configuration of this practical example is the same as the fourth practical example except that a workstation as the data processor 1001 has the functions of coefficient quantization map generation and coefficient quantization. This practical example can decrease the quality of a updated region as in the fourth practical example, but the updated region is displayed by decreasing the quantization accuracy, rather than the resolution as in the fourth practical example.

7. Seventh Embodiment

7.1) Encoding Device

Figure 20:
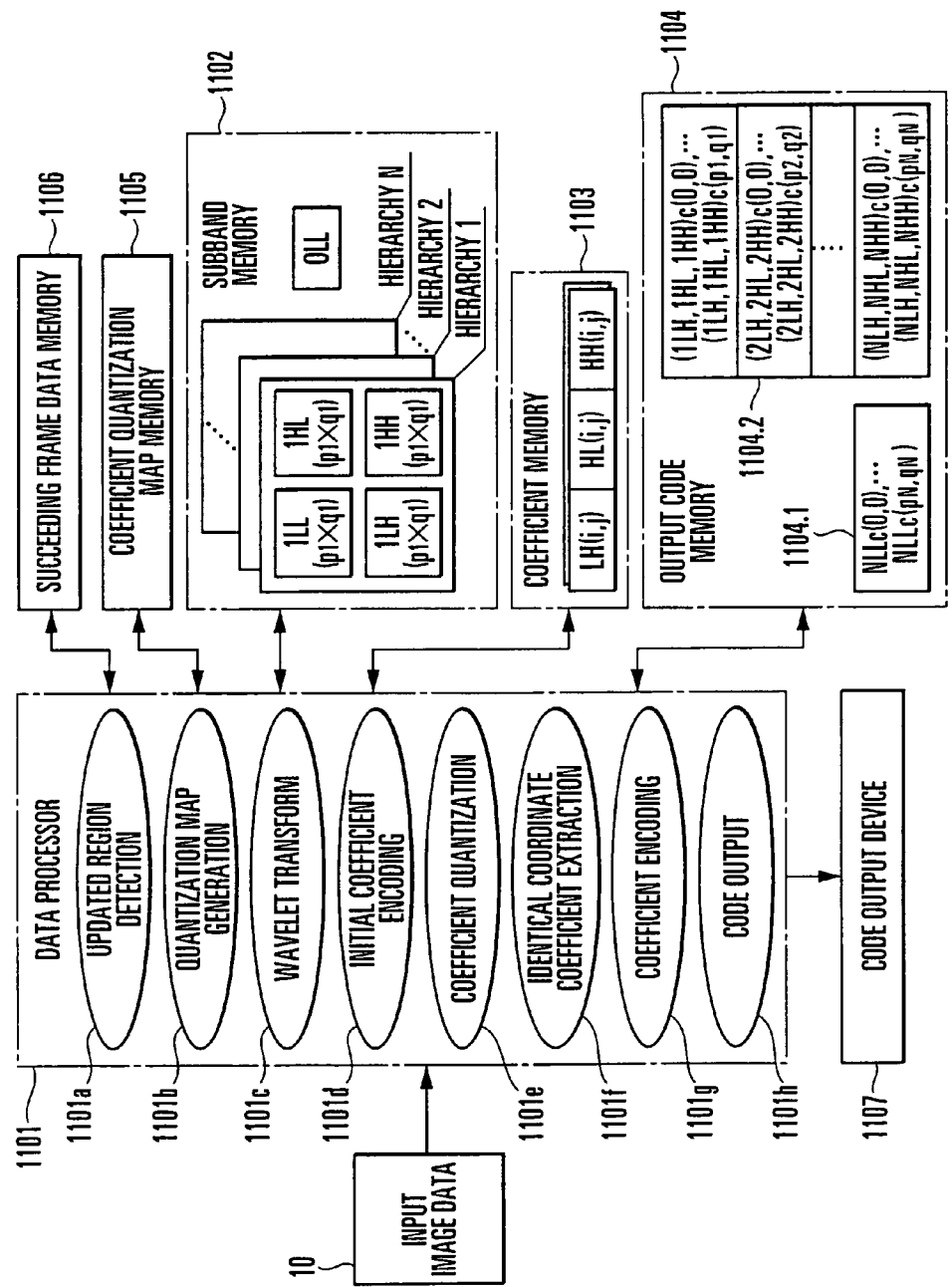
FIG. 20 is a block diagram showing an outline of the arrangement of an encoding device according to the seventh embodiment of the present invention.

FIG. 20 is a block diagram showing an outline of the arrangement of an encoding device according to the seventh embodiment of the present invention. The basic arrangement of this embodiment is the same as the first embodiment except that a data processor 1101 can generate a updated region detection process, coefficient quantization map generation process, and coefficient quantization process, and has a coefficient quantization map memory 1105 and succeeding frame data memory 1106.

That is, the data processor 1101 can generate a updated region detection process (updated region detecting means 1101a), a coefficient quantization map generation process (coefficient quantization map generating means 1101b), a wavelet transform (in this embodiment, two-dimensional Haar wavelet transform) process (wavelet transforming means 1101c), an identical coordinate coefficient extraction process (identical coordinate coefficient extracting means 1101d), a coefficient quantization process (coefficient quantizing means 1101e), an initial coefficient encoding process (initial coefficient encoding means 1101f), a coefficient encoding process (coefficient encoding means 1101g), and a code output process (code output means 1101h).

As in the fourth embodiment, the updated region detection process on the data processor 1101 detects a pixel value changing region (updated region, changed region) in the succeeding frame, from the present input image and the contents of the succeeding frame data memory 1106.

On the basis of information of the detected updated region, the coefficient quantization map generation process generates a coefficient thinning map in which the quantization accuracy of the updated region differs from that of the other region. More specifically, the updated region is set at low quantization accuracy, and the other region is set at high quantization accuracy. The generated coefficient quantization map is stored in the coefficient quantization map memory 1105.

The coefficient quantization process reads out an LH coefficient nA(i,j), HL coefficient nB(i,j), and HH coefficient nC(i,j) from the coefficient memory 1003. In addition, the coefficient quantization process reads out a coefficient quantization parameter corresponding to the spatial coordinate/resolution level from the coefficient quantization map memory 1105, and quantizes the LH coefficient nA(i,j), HL coefficient nB(i,j), and HH coefficient nC(i,j) to the quantization accuracy indicated by the parameter.

Figure 21:
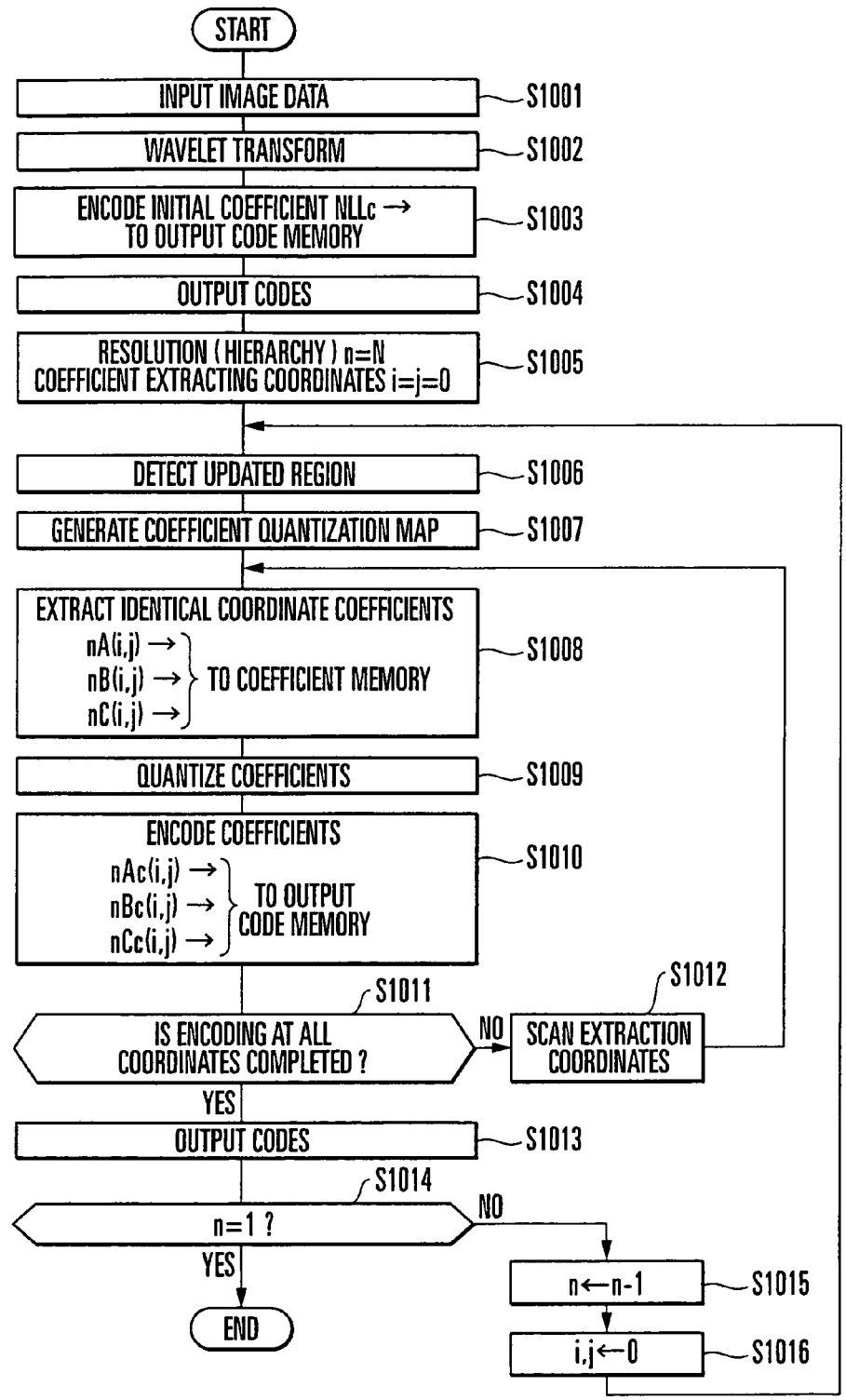
FIG. 21 is a flowchart showing encoding control according to the seventh embodiment of the present invention.

FIG. 21 is a flowchart showing encoding control in this embodiment.

First, when moving image data 10 is input from a moving image input device such as a video camera, frame data to be encoded is stored as a 0LL subband in a subband memory 1102, and the succeeding frame data is stored in the succeeding frame data memory 1106 (step S1001).

Then, the wavelet transform process on the data processor 101 executes N-stage two-dimensional Haar wavelet transform on the 0LL subband data read out from the subband memory 1102, and stores the results of the transform in the subband memory 1102 (step S1002).

When this two-dimensional Haar wavelet transform is completed, the initial coefficient encoding process reads out an initial coefficient NLL from a subband memory for a hierarchy N, performs variable-length coding by using a run-length Huffman code or LZW code, and stores codes NLLc(0,0), NLLc(1,0), . . . , NLLc($p_N$,$q_N$) in an NLL subband code memory 1104.1 of an output code memory 104 (step S1003).

The code output process reads out the code sequence stored in the output code memory 1104, and outputs the readout code sequence to a code output device 1107 (step S1004).

When the initial coefficient encoding is completed, LH, HL, and HH subbands are encoded next. First, a variable n indicating the resolution level (hierarchy) is set to N to set the LH, HL, and HH subbands of the hierarchy N as objects to be encoded (n=N), and the identical coordinate coefficient extraction process initializes the spatial coordinates (x,y) of coefficients to be extracted from subbands nLH, nHL, and nHH to the origin (i=j=0) (step S1005).

In this embodiment, the updated region detection process and coefficient quantization map generation process are activated before encoding of the LH, HL, and HH subbands at each resolution is executed.

The updated region detection process detects a updated region on the basis of the 0LL subband data stored in the LL subband memory 1102 and the succeeding frame data stored in the succeeding frame data memory 1106 (step S1006). An example of the updated region detection method is a method of calculating the difference between two frame images.

The coefficient quantization map generation process generates a coefficient quantization map in which the detected updated region is set at low quantization accuracy and the other region is set at high quantization accuracy, and stores the generated map in the coefficient quantization map memory 1105 (step S1007).

Subsequently, the identical coordinate coefficient extraction process reads out, from the subband memory 1102, a set of coefficients {nA(i,j),nB(i,j),nC(i,j)} at identical spatial coordinates (i,j) in the subbands nLH, nHL, and nHH of the hierarchy n, and stores the readout coefficient set in the coefficient memory 1103 (step S1008). When one or a plurality of coefficient sets are thus read out to the coefficient memory 1103, the coefficient quantization process starts to perform quantization.

The coefficient quantization process reads out the set of coefficients nA(i,j), nB(i,j), and nC(i,j) from the coefficient memory 1103, also reads out a coefficient quantization parameter corresponding to the spatial coordinate/resolution level, and quantizes the LH coefficient nA(i,j), HL coefficient nB(i,j), and HH coefficient nC(i,j) to the quantization accuracy indicated by the parameter. The contents of the coefficient memory 1103 are updated in accordance with the quantized coefficients (step S1009).

The coefficient encoding process reads out the set of coefficients nA(i,j), nB(i,j), and nC(i,j) from the coefficient memory 1103, performs variable-length coding on the readout coefficients, and stores the codes in a subband code memory 1104.2 of the output code memory 1104 (step S1010). When encoding of the coefficient set read out to the coefficient memory 1103 is completed, the identical coordinate coefficient extraction process checks whether encoding at all coordinates in the hierarchy n is completed (step S1011).

If encoding at all coordinates in the hierarchy n is not completed (NO in step S1011), the extraction coordinates (i,j) are shifted by a predetermined number in the scan line direction (step S1012), and steps S1008 to S1012 described above are repeated until encoding at all coordinates in the hierarchy n is completed.

If encoding at all coordinates in the hierarchy n is completed (YES in step S1011), the code output process reads out the code sequences stored in the output code memory 1104, and outputs the readout code sequences to the code output device 1107 (step S1013).

In addition, whether the present hierarchy n is n=1 as the maximum resolution is checked (step S1014). If n has not reached 1 (NO in step S1014), n is decremented by 1 (step S1015), and the spatial coordinates (x,y) of coefficients to be extracted from the subbands nLH, nHL, and nHH are initialized to the origin (i=j=0) (step S1016). Steps S1006 to S1016 described above are repeated while the hierarchy n is thus decreased by 1 at a time.

Note that in the above explanation, the updated region detection process and coefficient quantization map generation process are activated before the LH, HL, and HH subbands of each resolution level are encoded. To reduce the number of times of activation of the processes, however, it is also possible to activate these processes for every other predetermined resolution level, or at a predetermined resolution level or more.

7.2) Decoding Device

The codes output by the encoding method of this embodiment can be decoded by the decoding method of the first embodiment shown in FIGS. 4 and 5, so a detailed explanation thereof will be omitted.

7.3) Effects

In the encoding device and encoding control of the seventh embodiment, it is possible to increase the speed of the encoding process and reduce the necessary memory as in the first embodiment, and it is also possible to reduce the code amount of a updated region and increase the frame rate.

Additionally, in the seventh embodiment, a wider range in a frame can be detected as a updated region during encoding, so it is possible to further reduce the code amount and further increase the frame rate for the following two reasons.

First, in this embodiment, updated region detection is performed and a new coefficient quantization map is generated before the subbands LH, HL, and HH of each resolution are encoded. Accordingly, the frame is not updated when an image is input. Even when no updated region exists, therefore, coefficients can be roughly quantized after the next resolution level if the frame is updated before encoding of the next resolution level is performed. As a consequence, the code amount can be reduced.

Second, in this embodiment, the LH, HL, and HH subbands encoded at each resolution are directly output to the code output device 1107 such as a communication path. Since the processing speed of the code output device 1107 is generally lower than that of the data processor 1101, code output produces a long waiting time. In this embodiment, even when the frame is updated within this code output period, a updated region can be detected immediately before the next resolution level is encoded.

In this embodiment as described above, a new updated region can be detected from the succeeding frame even in the middle of encoding, so the code amount can be further reduced.

Note that although the code amount control method is a method using quantization in this embodiment, the same frame rate increasing effect can be achieved even by the use of code amount control by resolution termination as in the fourth embodiment.

7.4) Practical Example

Figure 22:
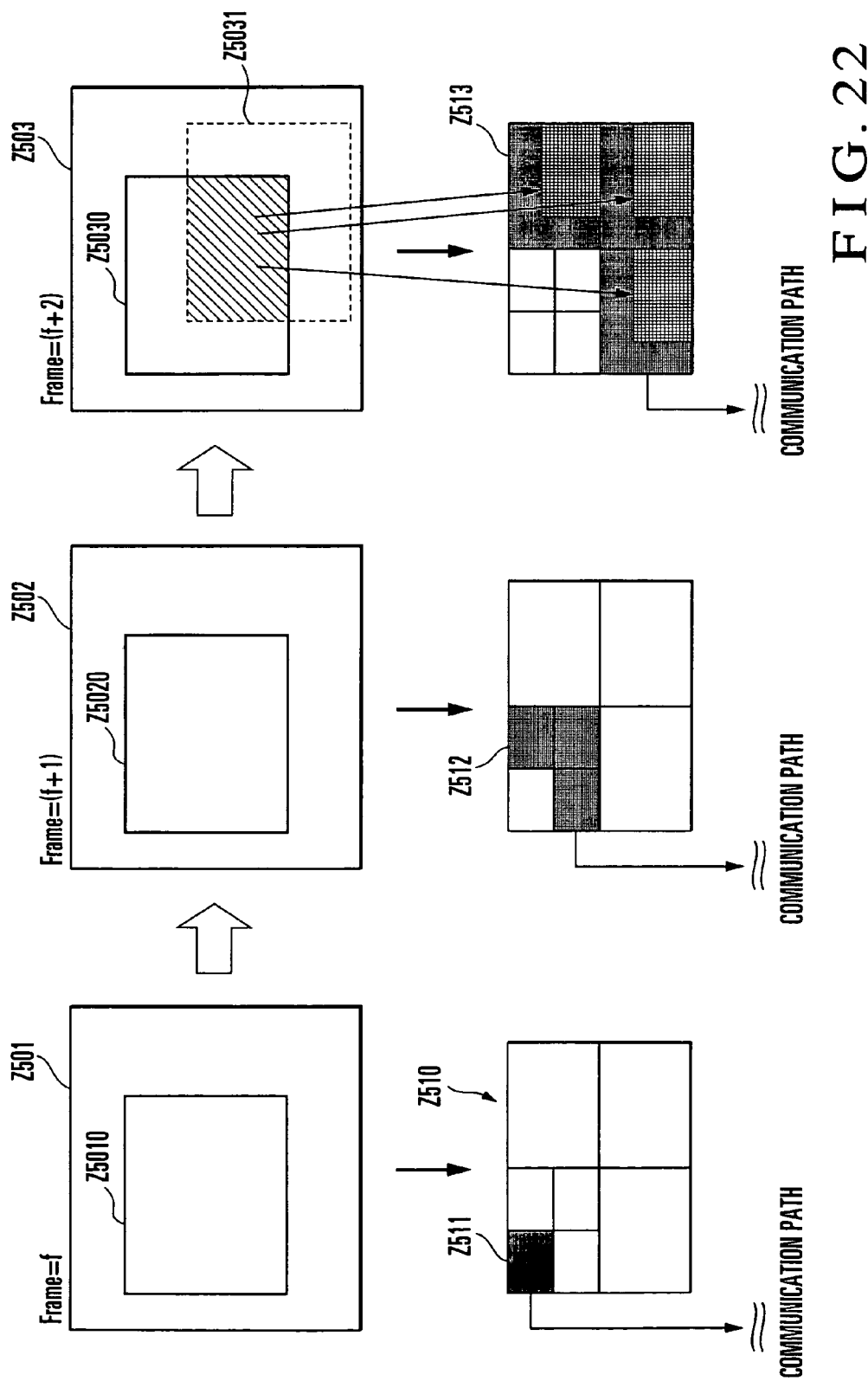
FIG. 22 is a view schematically showing a console screen for explaining updated region detection and a coefficient quantizing operation in the seventh embodiment of the present invention.

FIG. 22 is a view schematically showing a console screen for explaining the operations of updated region detection and coefficient quantization according to the seventh embodiment of the present invention. The basic configuration of this practical example is the same as the fourth practical example except that a workstation as the data processor 1101 can generate a coefficient quantization map generation process and coefficient quantization process.

FIG. 22 schematically shows the way updating regions of frame images are sequentially supplied, encoded, and transmitted. Z501, Z502, and Z503 respectively denote the console screens of the workstation in frames f, (f+1), and (f+2). Also, Z5010, Z5020, and Z5030 respectively denote regions encoded in the frames f, (f+1), and (f+2), and Z5031 denotes a succeeding frame region newly supplied in the frame (f+2).

In the frame f, the workstation acquires the input image Z501, and performs wavelet transform on the region Z5010 of the input image Z501, thereby obtaining individual frequency subbands Z510. In addition, the workstation encodes Z511 as the LL component of the lowest resolution by variable-length coding, and outputs the code to a communication path.

Then, in the frame (f+1), the updated region detection process of the workstation checks whether there is a succeeding frame, before encoding the LH, HL, HH subbands of the next resolution level. Since the frame (f+1) has no succeeding frame, the coefficient quantization map uses high-accuracy quantization steps over the entire region of the subbands. In this manner, coefficient quantization is performed by the high-accuracy quantization steps, and the coefficient encoding process encodes LH, HL, and HH subbands Z512 and outputs the codes to the communication path.

Finally, in the frame (f+2), whether there is a succeeding frame is checked before the LH, HL, and HH subbands of the next resolution level are encoded. Since the frame (f+2) has the succeeding frame Z5031, a range within which the succeeding frame exists in the subband is detected as a updated region. In addition, a coefficient quantization map is so generated that this updated region is coarsely quantized. In this way, coefficient quantization is performed by low-accuracy quantization steps in the updated region and by high-accuracy quantization steps in the other region, and the coefficient encoding process encodes LH, HL, and HH subbands Z513, and outputs the codes to the communication path.

The thus output code sequence is decoded by the decoding device to obtain an image in which only the coefficients of the updated region are coarsely quantized.

8. Eighth Embodiment

In the first to seventh embodiments, image data encoded by the encoding device is decoded by the decoding device. However, it is also possible to perform bidirectional image communication between one communication terminal incorporating an encoding device and decoding device and another communication terminal. This communication will be explained below by taking a communication terminal (e.g., a cell phone with a camera) connected to a camera and display as an example.

Figure 23:
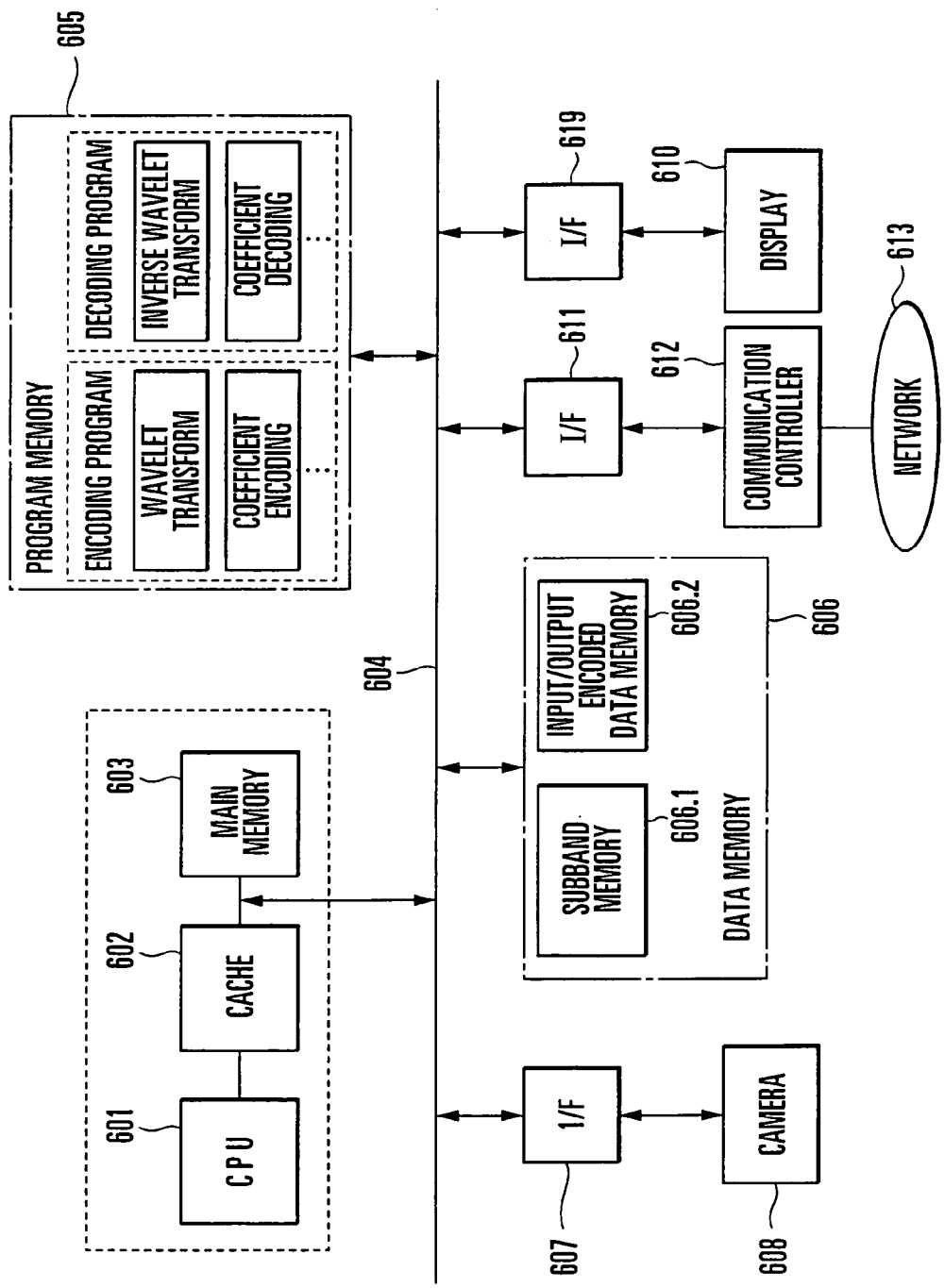
FIG. 23 is a block diagram of a bidirectional communication terminal incorporating an encoding device and decoding device according to the eighth embodiment of the present invention.

FIG. 23 is a block diagram of a bidirectional communication terminal incorporating an encoding device and decoding device according to the eighth embodiment of the present invention. This terminal has a CPU 601 as a program control processor which is connected to a cache memory 602 and main memory 603 by an internal bus. The internal bus is further connected to an external bus 604 through a port, and the external bus 604 is connected to, e.g., a memory 605 storing necessary programs, a data memory 606, an interface 607 for connecting a cameral 608, an interface 609 for connecting a display 610, and an interface 611 for connecting a communication controller 612. The communication controller 612 is connected to a network 613. When this terminal is a cell phone, the communication controller 612 includes a wireless communication unit and channel controller, and the network 613 is a mobile communication network.

The program memory 605 stores an encoding program, a decoding program, and a main program for controlling the overall operation of the communication terminal. The encoding program is expressed by the flowchart shown in any of FIGS. 3, 7, 10, 13, 16, 19, and 21 explained in the first to seventh embodiments, and the decoding program is expressed by the flowchart shown in FIG. 5. The above-mentioned processes of the encoding program and decoding program are executed under the control of processes by the main program.

The data memory 606 includes a subband memory 606.1 and input/output encoded data memory 606.2. The subband memory 606.1 is, e.g., the subband memory 102 shown in FIG. 1 or the LL subband memory 302 shown in FIG. 6. The input/output encoded data memory 602.2 includes an output code memory such as the output code memory 104 or 304 shown in FIG. 1 or 6, and an input code memory such as the 0LL subband memory shown in FIG. 4.

Also, the camera 608 is equivalent to the image input device of the encoding device, and the display 610 is equivalent to the image output device 204 of the decoding device. Image data sensed by the camera is wavelet-transformed and encoded as described earlier, and the code sequence is transmitted to the partner terminal across the network. On the other hand, a code sequence of image data received from the partner is decoded, inversely wavelet-transformed, and displayed on the display 610 as described above. Details of the operations are already explained above, and the cache memory 602 can be used as a coefficient memory in both encoding and decoding.

9. Ninth Embodiment

The encoding device and decoding device according to the present invention can be implemented by executing various control programs on the CPU as described previously, but can also be implemented by hardware.

An arrangement in which the individual processes of the first embodiment described earlier are implemented by hardware will be explained below, but the same arrangement is applicable to the other embodiments.

Figure 24:
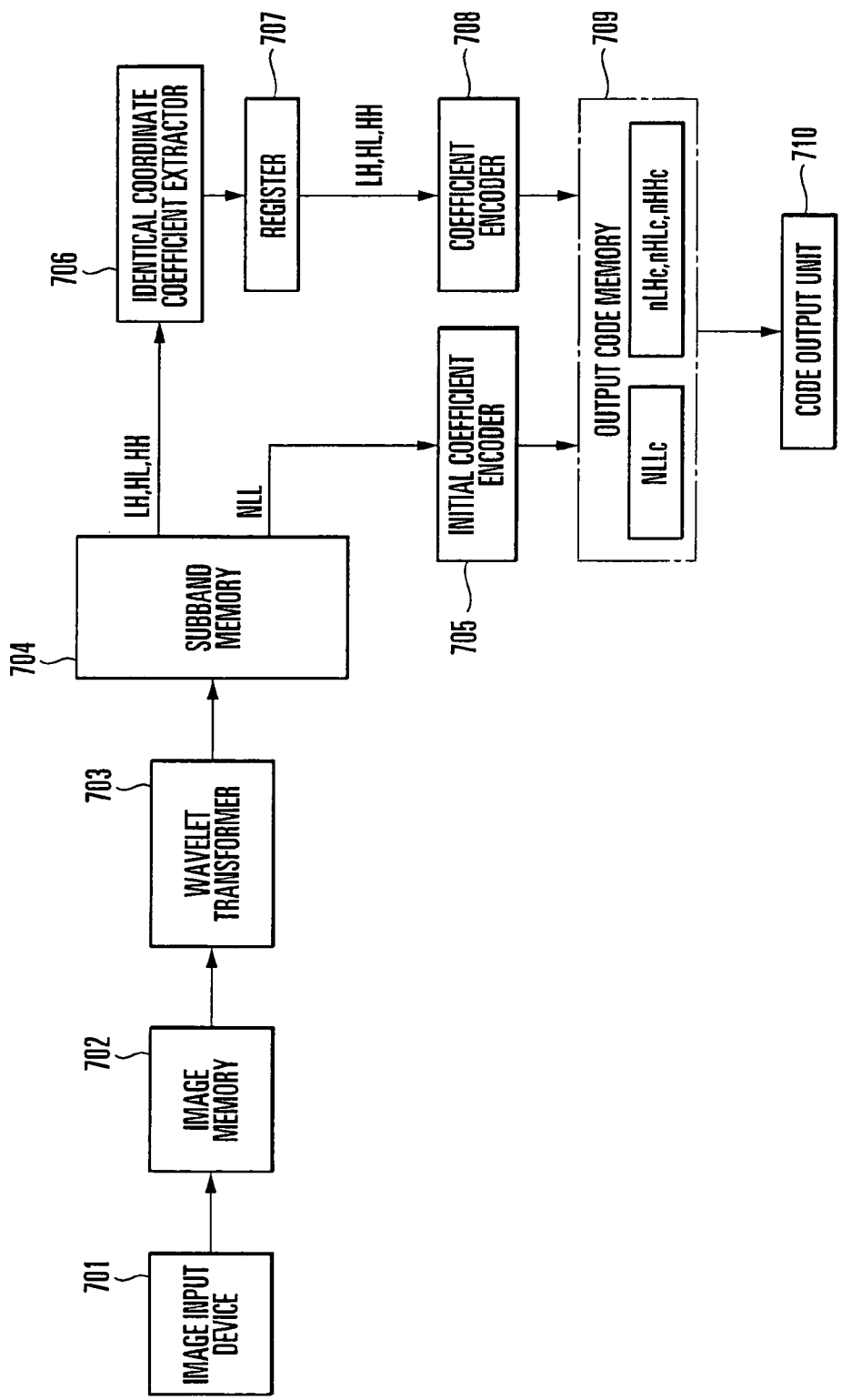
FIG. 24 is a block diagram showing an outline of the arrangement of an encoding device according to the ninth embodiment of the present invention.

FIG. 24 is a block diagram showing an example of an encoding device according to the ninth embodiment of the present invention. Image data input from an image input device 701 such as a camera is stored in an image memory 702 and sequentially wavelet-transformed by a wavelet transformer 703 as described previously. Subband coefficients LL, LH, and HH thus obtained are stored in a subband memory 704, and an initial coefficient NLL is encoded by an initial coefficient encoder 705 and stored in an output code memory 709. In addition, an identical coordinate coefficient extractor 706 extracts a set of coefficients at identical coordinates of other subbands LH, HL, and HH from the subband memory 704, and stores one or a predetermined number of two or more coefficient sets in a high-speed register 707. The coefficient sets stored in the register 707 are encoded by a coefficient encoder 708, and stored in the output code memory 709. The NLL code and the codes of the identical coordinate coefficient sets thus stored in the output code memory 709 are sequentially read out and output by a code output unit 710.

Figure 25:
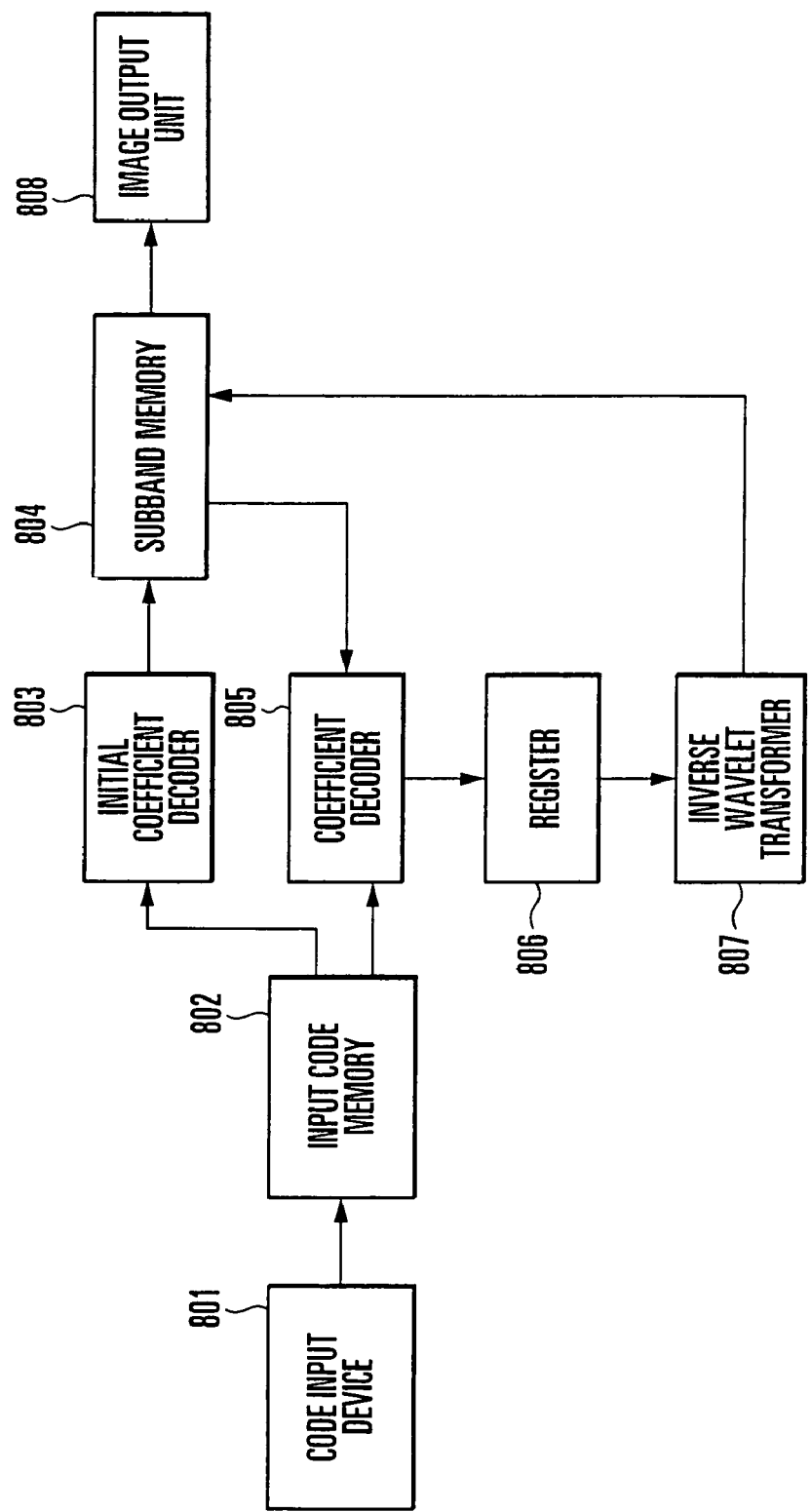
FIG. 25 is a block diagram showing an outline of the arrangement of a decoding device according to the ninth embodiment of the present invention.

FIG. 25 is a block diagram showing an example of a decoding device according to the ninth embodiment of the present invention. FIG. 25 shows the hardware configuration of the first embodiment described earlier. The code sequence transmitted from the encoding device described above is input by a code input device 801, and stored in an input code memory 802. First, an initial coefficient decoder 803 decodes the initial coefficient NLL and stores it in a subband memory 804. Subsequently, a coefficient decoder 805 sequentially decodes one or a predetermined number of two or more subband coefficient sets nLH, nHL, and nHH from the input codes, and stores them in a register 806. An inverse wavelet transformer 807 reads out the coefficient sets from the register 806, inversely wavelet-transforms the readout coefficient sets, and stores the results in the subband memory 804. When the resolution level of an output image is reached, an image output unit 808 outputs the image data after that.

As has been explained above, the encoding/decoding control according to the present invention can achieve a high-speed encoding/decoding process by using a general-purpose CPU, and can also reduce the intermediate memory.

Note that particularly image data is processed in the first to ninth embodiments of the present invention explained above, but the present invention is of course also applicable to two-dimensional data other than image data.

Note also that the processing programs for implementing the present invention as explained above can also be stored in a recording medium such as a magnetic disk or CD-ROM. Both the processing programs and the recording medium storing them are incorporated in the scope of the present invention.

Industrial Applicability

The encoding/decoding device according to the present invention is applicable to an application in which, e.g., a high-resolution image is gradually distributed in accordance with the resolution of a display device or the operation/request by a viewer.

The invention claimed is:
1. An encoding device comprising:
two-dimensional Haar wavelet transforming means for dividing an image into a plurality of subbands;
coefficient extracting means for extracting m (m being an integer: m≧1) sets of AC coefficients from m spatial coordinates of a same hierarchy subbands in a scan line order as m coefficient sets;
coefficient encoding means for encoding the m coefficient sets to obtain codes, and concatenating the codes in the scan line order in the same hierarchy to generate a code sequence of a high-frequency subband;
initial coefficient encoding means for encoding and concatenating a DC component as a lowest-frequency subband to generate a code sequence of the lowest-frequency subband; and
code output means for outputting the code sequence of the lowest-frequency subband, and outputting, from a low-frequency to a high-frequency, the code sequence of the high-frequency subband generated by said coefficient encoding means,
wherein each coefficient set consists of an LH, an HL and an HH coefficient belonging to a same spatial coordinate of same hierarchy subbands, the coefficient encoding means sequentially encodes current coefficient set at the same time before the coefficient extracting means extracts the next coefficient set belonging to the next spatial coordinates of the same hierarchy subbands in the scan line order.

2. An encoding device according to claim 1, characterized in that said coefficient extracting means sequentially extracts coefficient sets one by one.

3. An encoding device according to claim 1, characterized in that each coefficient comprises a plurality of components, and said coefficient encoding means encodes each component of a coefficient, and generates a code by concatenating a code of each component.

4. An encoding device according to claim 1, characterized in that each coefficient comprises a plurality of components, and said coefficient encoding means encodes each component of a coefficient, and generates a code by concatenating a code of each coefficient.

5. An encoding device comprising:
   two-dimensional Haar wavelet transforming means for extracting, as signal blocks, signals of 2 m×2 (m is an integer: m≧1) spatially adjacent elements in a scan line order from an image or an LL subband of a same hierarchy of a wavelet to perform a two dimensional Haar wavelet transform to the signal block;
   coefficient extracting means, extracting LH, HL and HH coefficients belonging to same spatial coordinates from coefficients obtained by the two-dimensional Haar wavelet transform as coefficient sets, thereby outputting m coefficient sets whenever said two-dimensional Haar wavelet transforming means is performed;
   coefficient encoding means for encoding the m coefficient sets to obtain codes, and concatenating the codes in the scan line order in the same hierarchy to generate a code sequence of a high-frequency subband whenever the coefficient extracting means outputs the m coefficient sets;
   initial coefficient encoding means for encoding and concatenating a DC component as a lowest-frequency subband to generate a code sequence of the lowest-frequency subband; and
   code output means for outputting the code sequence of the lowest-frequency subband, and outputting, from a low frequency to a high frequency, the code sequence of the high-frequency subband generated by said coefficient encoding means,
   wherein each coefficient set consists of an LH, an HL and an HH coefficient belonging to a same spatial coordinate of same hierarchy subbands, the coefficient encoding means sequentially encodes current coefficient set at the same time before the coefficient extracting means extracts the next coefficient set belonging to the next spatial coordinates of the same hierarchy subbands in the scan line order.

6. An encoding device according to claim 5, characterized in that each coefficient comprises a plurality of components, and said coefficient encoding means encodes each component of a coefficient, and generates a code by concatenating a code of each component.

7. An encoding device according to claim 5, characterized in that each coefficient comprises a plurality of components, and said coefficient encoding means encodes each component of a coefficient, and generates a code by concatenating a code of each coefficient.

8. A decoding device comprising:
   initial coefficient decoding means for receiving a code sequence of a plurality of subband coefficients obtained by two-dimensional Haar wavelet transform of N hierarchies (N being an integer: N≧1), and decoding LL subband coefficients of an Nth hierarchy from the code sequence for all spatial coordinates;
   coefficient decoding means for decoding an LL subband of an nth hierarchy (n being an integer: 1≦n≦N) for all spatial coordinates, sequentially receiving a code sequence corresponding to LH, HL and HH coefficients of an (n−1)th hierarchy, performing a decoding operation to each of m sets (m being an integer: m≧1) of the LH, HL and HH coefficients of the (n−1)th hierarchy at a spatially same position in a scan line order, and repeating the decoding operation until all spatial coordinates of the (n−1)th hierarchy are decoded; and
   inverse wavelet transforming means for performing two-dimensional Haar inverse wavelet transform using the decoded LH, HL and HH coefficients of the m sets and the LL subband coefficients of the nth hierarchy at the same spatial coordinates, thereby generating an original image serving as the LL subband of the (n−1)th hierarchy or an LL subband of a $0^{th}$ hierarchy immediately after the coefficient sets of the m sets are decoded.

9. A decoding device according to claim 8, characterized in that said coefficient decoding means sequentially decodes a predetermined number of coefficient sets at a time in a scan line direction of the two-dimensional signal.

10. A decoding device according to claim 9, characterized in that said coefficient decoding means sequentially decodes the coefficient sets one by one.

11. A decoding device according to claim 10, characterized in that each coefficient comprises a plurality of components, and said coefficient decoding means decodes each component of a coefficient, and concatenates each component.

12. A decoding device according to claim 10, characterized in that each coefficient comprises a plurality of components, and said coefficient decoding means decodes each component of a coefficient.

13. An encoding program embodied on a non-transitory computer-readable medium for causing a computer to execute the steps of:
   dividing an image into a plurality of subbands;
   encoding and concatenating a DC component as a lowest-frequency subband to generate a code sequence of the lowest-frequency subband;
   extracting m (m being an integer: m≧1) sets of AC coefficient from m spatial coordinates of same hierarchy subbands in a scan line order as m coefficient sets;
   encoding the m coefficient sets to obtain codes, and concatenating the codes in the scan line order in the same hierarchy to generate a code sequence of a high-frequency subband; and
   outputting the code sequence of the lowest-frequency subband, and outputting, from a low-frequency to a high-frequency, the code sequence of the high-frequency subband,
   wherein each coefficient set consists of an LH, an HL and an HH coefficient belonging to a same spatial coordinates of same hierarchy subbands, the coefficient encoding step sequentially encodes current coefficient set at the same time before the extracting step extracts the next coefficient set belonging to the next spatial coordinates of the same hierarchy subbands in the scan line order.

14. An encoding program embodied on a non-transitory computer-readable medium for causing a computer to execute the steps of:
   sequentially extracting 2 m×2 (m is an integer: m≧1) spatially adjacent elements in a scan line order from an image or an LL subband of a same hierarchy of a wavelet as a signal block to perform a two dimensional Haar wavelet transform to the signal block;

extracting LH, HL and HH coefficients belonging to same spatial coordinates from coefficients obtained by the two-dimensional Haar wavelet transform as coefficient sets, thereby outputting m coefficient sets whenever said two-dimensional Haar wavelet transforming means is performed;

encoding and concatenating a DC component as a lowest-frequency subband to generate a code sequence of the lowest-frequency subband;

encoding the m coefficient sets to obtain codes, and concatenating the codes in the scan line order in the same hierarchy to generate a code sequence of a high-frequency subband whenever the coefficient extracting means outputs the m coefficient sets; and outputting the code sequence of the lowest-frequency subband, and outputting, from low frequency to high frequency, the code sequence of the high-frequency subband, wherein each coefficient set consists of an LH, an HL and an HH coefficient belonging to a same spatial coordinate of same hierarchy subbands, the coefficient encoding step sequentially encodes current coefficient set at the same time before the extracting step extracts the next coefficient set belonging to the next spatial coordinates of the same hierarchy subbands in the scan line order.

15. A decoding program embodied on a non-transitory computer-readable medium for causing a computer to execute the steps of:

receiving a code sequence of a plurality of subband coefficients obtained by two-dimensional Haar wavelet transform of N hierarchies (N being an integer: $N \geq 1$);

decoding LL subband coefficients of an Nth hierarchy from the code sequence for all spatial coordinates;

decoding an LL subband of an nth hierarchy (n being an integer: $1 \leq n \leq N$) for all spatial coordinates, sequentially receiving a code sequence corresponding to LH, HL and HH coefficients of an (n−1)th hierarchy, performing a decoding operation to each of m sets (m being an integer: $m \geq 1$) of the LH, HL and HH coefficients of the (n−1)th hierarchy at a spatially same position in a scan line order, and repeating the decoding operation until all spatial coordinates of the (n−1)th hierarchy are decoded; and performing two-dimensional Haar inverse wavelet transform using the decoded LH, HL and HH coefficients of the m sets and the LL subband coefficients of the nth hierarchy at the same spatial coordinates, thereby generating an original image serving as the LL subband of the (n−1)th hierarchy or an LL subband of a $0^{th}$ hierarchy immediately after the coefficient sets of the m sets are decoded.

16. A communication terminal characterized by comprising:

image input means;

communicating means for transmitting and receiving an encoded image signal;

two-dimensional Haar wavelet transforming means for dividing an image into a plurality of subbands;

coefficient extracting means for extracting m (m being an integer: $m \geq 1$) sets of AC coefficients from m spatial coordinates of a same hierarchy subbands in a scan line order as m coefficient sets;

coefficient encoding means for encoding the m coefficient sets to obtain codes, and concatenating the codes in the scan line order in the same hierarchy to generate a code sequence of a high-frequency subband;

initial coefficient encoding means for encoding and concatenating a DC component as a lowest-frequency subband to generate a code sequence of the lowest-frequency subband;

code output means for outputting the code sequence of the lowest-frequency subband to said communication means, and outputting, from a low-frequency to a high-frequency, the code sequence of the high-frequency subband generated by said coefficient encoding means to said communication means, wherein each coefficient set consists of an LH, an HL and an HH coefficient belonging to a same spatial coordinate of same hierarchy subbands, the coefficient encoding means sequentially encodes current coefficient set at the same time before the coefficient extracting means extracts the next coefficient set belonging to the next spatial coordinates of the same hierarchy subbands in the scan line order;

initial coefficient decoding means for receiving a code sequence of a plurality of subband coefficients obtained by two-dimensional Haar wavelet transform of N hierarchies (N being an integer: $N \geq 1$), and decoding LL subband coefficients of an Nth hierarchy from the code sequence for all spatial coordinates;

coefficient decoding means for decoding an LL subband of an nth hierarchy (n being an integer: $1 \leq n \leq N$) for all spatial coordinates, sequentially receiving a code sequence corresponding to LH, HL and HH coefficients of an (n−1)th hierarchy, performing a decoding operation to each of m sets (m being an integer: $m \geq 1$) of the LH, HL and HH coefficients of the (n−1)th hierarchy at a spatially same position in a scan line order, and repeating the decoding operation until all spatial coordinates of the (n−1)th hierarchy are decoded;

inverse wavelet transforming means for performing two-dimensional Haar inverse wavelet transform using the decoded LH, HL and HH coefficients of the m sets and the LL subband coefficients of the nth hierarchy at the same spatial coordinates, thereby generating an original image serving as the LL subband of the (n−1)th hierarchy or an LL subband of a $0^{th}$ hierarchy immediately after the coefficient sets of the m sets are decoded; and image display means for displaying a received image on the basis of the received image signal.

* * * * *